United States Patent

Deutsch et al.

[15] 3,639,694

[45] Feb. 1, 1972

[54] TIME DIVISION MULTIPLEX COMMUNICATIONS SYSTEM

[72] Inventors: Herman Deutsch; Edgar H. Steward; Walter D. Van Gieson, Jr., all of Raleigh, N.C.

[73] Assignee: International Business Machines Corporation, Armonk, N.Y.

[22] Filed: Jan. 15, 1969

[21] Appl. No.: 791,334

[52] U.S. Cl. ........ 179/15 AL

[51] Int. Cl. ........ H04j 3/00

[58] Field of Search ........ 179/15 AL, 15 BU, 18.3 C, 15 AS; 340/172.5

[56] References Cited

UNITED STATES PATENTS

| | | | |
|---|---|---|---|
| 3,544,976 | 12/1970 | Collins | 179/15 AL |
| 2,920,143 | 1/1960 | Filipowsky | 179/15 BA |
| 3,519,750 | 7/1970 | Beresin et al. | 179/15 AL |
| 3,529,089 | 9/1970 | Davis et al. | 179/15 AL |
| 3,223,784 | 12/1965 | Inose et al. | 179/15 |
| 3,245,038 | 4/1966 | Stafford et al. | 340/172.5 X |
| 3,406,257 | 10/1968 | Long | 179/15 AS |
| 3,458,661 | 7/1969 | Forde et al. | 179/15 AL |
| 3,483,329 | 12/1969 | Hunkins et al. | 179/15 AL |
| 3,513,264 | 5/1970 | Baer | 179/15 BA |

*Primary Examiner*—Kathleen H. Claffy
*Assistant Examiner*—David L. Stewart
*Attorney*—Hanifin and Jancin and John B. Frisone

[57] ABSTRACT

A closed loop two-wire serial communications system for providing two-way communications between a plurality of serially connected terminal complexes and a central control station. The communications system including a plurality of time multiplexed channels each having switching or multiplexing information, control information and data to effect bidirectional data flow between the terminal complexes and the central.

9 Claims, 27 Drawing Figures

INVENTORS
HERMAN DEUTSCH
EDGAR H. STEWARD
WALTER D. VAN GIESON, JR.

BY [signature]
ATTORNEY

FIG. 19

| TRANSMITTED COMMAND | VALID RESPONSE | NEW COMMAND |
|---|---|---|
| READ NULL | READ DATA REQUEST<br>READ REQUEST<br>READ END REQUEST<br>READ NULL ACK | READ DATA COMMAND<br>READ COMMAND<br>READ END COMMAND<br>READ NULL |
| READ DATA COMMAND | READ DATA ACK | READ NULL |
| READ COMMAND | READ COMMAND ACK | READ NULL |
| READ END COMMAND | READ END ACK | *SYNC LOADED BY INPUT CONTROL FIG. 16 |
| WRITE COMMAND | WRITE COMMAND ACK | WRITE NULL |
| WRITE NULL | WRITE NULL ACK<br>WRITE DATA REQUEST | WRITE NULL<br>{WRITE DATA COMMAND (NORMAL)<br>WRITE END COMMAND SPECIAL GENERATE BY WRITE END ENCODER SEE FIGS 4 & 16 |
| WRITE DATA COMD | WRITE DATA ACK | WRITE NULL |
| WRITE END COMD | WRITE END ACK | *SYNC LOADED BY INPUT CONTROL FIG. 16 |
| SYNC | SYNC | SYNC |

TIME DIVISION MULTIPLEX COMMUNICATIONS SYSTEM

BACKGROUND

1. Field of the Invention

The invention relates to communications systems generally and more specifically to a two-wire serial time division multiplexed communications system for providing two-way communications between a plurality of remote terminal complexes and a central control station.

2. Description of the Prior Art

Data collection and distribution systems may be organized for either parallel or serial operation. Parallel systems have many advantages, however, their complexity and limited distance for bit rates approximating 500,000 per second without independent signal repeaters makes them impractical for factory or other large scale data collection systems.

Serial systems are less complex since they do not require switching networks. Signal repeaters can be located at the various terminals and independent repeaters are not needed where the distance between adjacent terminals is not great. Since the connections are from terminal to terminal a larger geographic area may be serviced without independent repeaters than is the case with parallel distribution and collection for the bit rate contemplated.

Prior art serial systems have employed both time division and frequency multiplexing, however, time division multiplexing offers advantages over frequency multiplexing and has found wider useage. Transmission has invariably utilized frequency shift keying in either start-stop or synchronous mode.

Serial systems do not require switching networks to establish communications between a particular remote terminal and the central, however, polling in one form or another, must be employed to regulate the traffic on the common line. Many different polling techniques have been utilized and some are better suited than others depending on the physical arrangement and data rates of the terminal devices connected to the common communications channel. Generally the central precedes the transmission of data to a particular remote station with a unique station address and enables communication between a unique remote station and the central by addressing the station and sending control information either enabling or requiring the remote station to respond. The prior art systems constructed as set forth above are satisfactory where low data rate terminals are used, or where a low volume of data is expected or where automatic transmission and reception coupled with relatively low data volume are used. The prior art systems are unsatisfactory where large data volumes must be handled by terminals having relatively fast data rates such as is encountered in a large factory data collection system. In systems of this type many operators attempt to input data via terminals having relatively fast data rates and delays in transmission cannot be tolerated. It must appear to the operator that his terminal is operatively connected to the central at all times and that data transmission occurs as fast as he can input the data via punch cards, badges, keyboards or the like.

SUMMARY OF THE INVENTION

The invention contemplates a data communications system for transmitting data between a central transmitting station and a plurality of remote terminals comprising, a two conductor transmission medium interconnecting the remote terminals in series and the central station to the first and last terminals in the series to form a series transmission loop, the central station including means for establishing a plurality of time multiplexed channels each having switching or multiplexing information, control information and data to effect bidirectional data flow between the terminals and the central station.

One object of the invention is to provide-a two-wire data communications system capable of transmitting large quantities of data between a central station and many remotely located terminals.

Another object of the invention is to provide a communications system as set forth above in which the central station performs on a time shared basis substantially, all control functions thus reducing the complexity of the remote stations or terminals while maintaining high transmission rate.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIGS. 8 through 20 are detailed block diagrams of circuit components shown in FIG. 4, and FIGS. 21 through 23 are detailed block diagrams of circuits shown in FIG. 5.

DESCRIPTION OF THE PREFERRED EMBODIMENT

Figure 1:
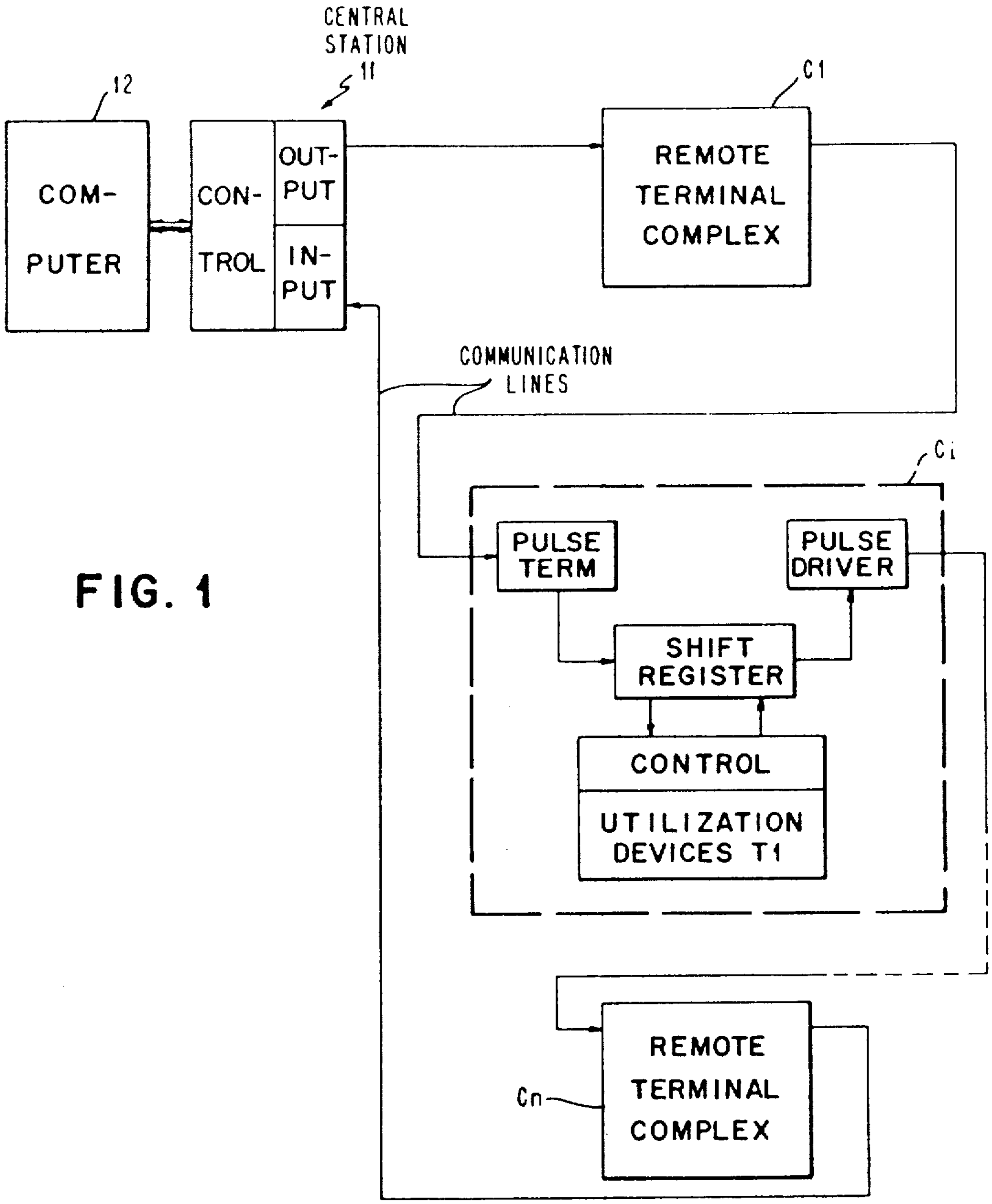
FIG. 1 is a simplified block diagram of a novel communications system constructed in accordance with the invention.

In FIG. 1, a central station 11 having a control section, an input section and an output section is connected via conventional means to a computer 12. Computer 12 receives and provides data to a plurality of remote terminals T1–T*n*. The terminals are arranged in complexes C1–C*n*. The output section of the central station is connected to the first terminal complex C1 by a twisted pair of conductors which may be ordinary AGW22 wire in a twisted pair configuration. The twisted pair of conductors are connected to a pulse terminating circuit located within the complex, the output of which is connected to a shift register. As the pulses defining the bit patterns transmitted on the twisted pair are received, they are inserted in the shift register. The shift register has a finite length and delays the pulses coming into the first terminal complex by an amount of time equal to the finite length in the shift register. The last stage of the shift register is connected to a pulse driver located within remote terminal complex C1 and has its output connected to a similar twisted pair. In this manner, each of the terminal complexes are connected. The last terminal complex C*n* has its pulse driver connected to the input section of the central station. Thus, data supplied by the computer is transmitted from the output section through each of the terminal complexes in a series loop and returns back to the input section of the central station 11.

Data originating at any terminal complex is inserted in the stream of data in a manner which will be described subsequently and is sent back through subsequent remote terminal complexes to the input section of the central station 11. Each of the terminal complexes has a control section connected to the shift register and looks at the finite number of bits contained therein periodically to determine various factors concerning the information in the shift register. According to a control system which will be subsequently described, data residing in the shift register within a remote terminal complex is utilized in parallel fashion within the utilization devices T1–T*n* connected to the various terminal complexes.

The system contemplates the transmission of binarily coded data in which ones and zeros are transmitted in sequence serially on the transmission line to the various devices. Bipolar pulses are utilized for coding the data. The bipolar pulse representing a one has a fixed phase relationship and the ipolar pulse representing a zero is of opposite phase. Each ulse includes a reference level at the termination of the bit eriod. With this mode of transmission, the average DC current is 0. For organization purposes, a number of pulses epresent a byte or unit of information and a selected number f bytes or units of information are designated communications channels.

Figure 2:
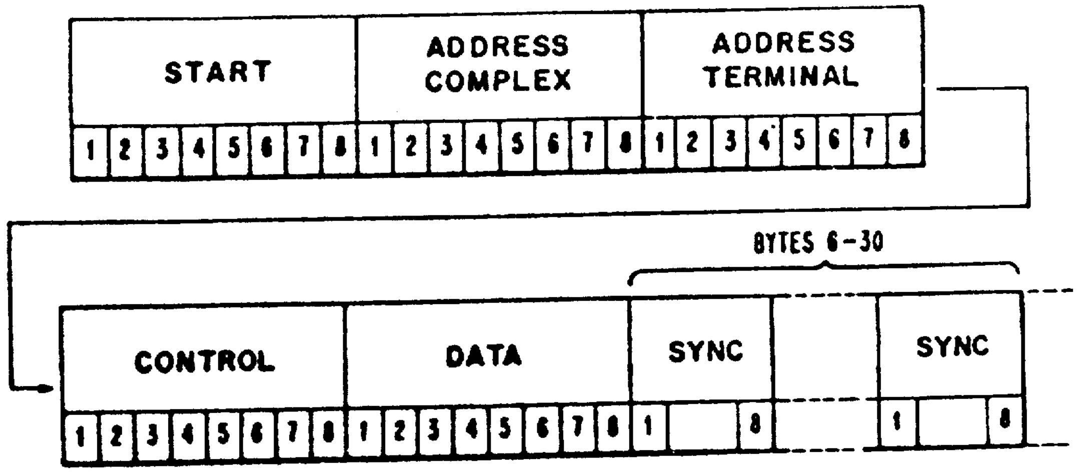
FIGS. 2 and 3 are diagrammatic representations of serial data arrangements utilized in the communications system.

FIG. 2 is a diagrammatic representation of the organization f a channel. In FIG. 2, the byte unit of data includes eight bits f information which may be either zero or one or combinaions thereof, each defining specific information. There are included within the communications channel 30 such bytes. The irst byte defining a channel is labeled "start." This byte is a nique eight-bit code which is interpreted as defining the start ondition of the channel. The second byte is a unique eight-bit ode defining the terminal complex. The system contemplated nay have as many as 100 terminal complexes serially conected in a loop. The third byte is a unique eight-bit code lefining the address of a terminal device connected to a paricular terminal complex defined by the second byte. If only ne terminal is connected to the complex, then this byte of lata is not necessary, however, in the contemplated system, it s expected that as many as 40 or more terminal devices may e connected to a single complex. The fourth data byte is a nique eight-bit code utilized for control purposes. This eightit code defines the function which may be performed with he particular communication channel within which it resides. The fifth byte is a unique eight-bit code which defines data. The data contained in this byte may be utilized for operating a printer, displaying the time of day, illuminating lights, or any number of purposes. It may also be used to input information from a terminal to the computer when the appropriate control byte is present. Bytes 6–30 are utilized for synchronization purposes in the system disclosed, however, if conditions require, any number of these bytes may be utilized for transferring data in both directions. With the terminal devices contemplated, the transmission rate of data is such that a single data byte having eight bits per channel is adequate for servicing all devices.

Figure 3:
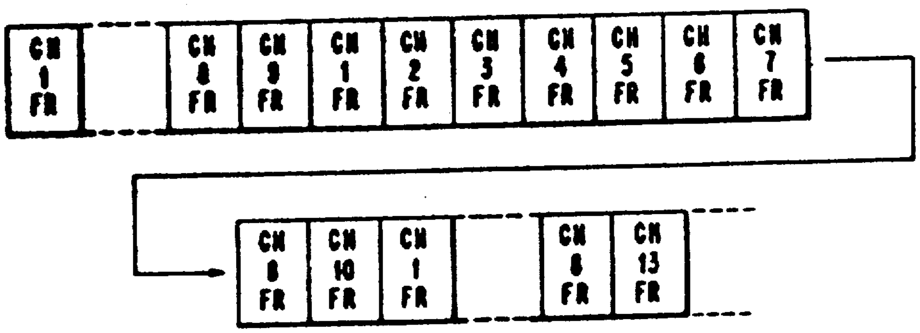

FIG. 3 is a diagrammatic representation of the various channels in their sequential order. Channels 1 through 9 appear in sequence. This group is followed by 1 through 8 and 10 which is in turn followed by 1 through 8 and 11. The series repeats after 1 through 8 and 13 has been transmitted. Approximately two to four channels will be out on the external loop at any given time, the remaining channels are stored either in the central station or possibly in the control computer depending upon the configuration desired. According to the preferred embodiment described, the channels not on the communications loop are stored in the central station in a core buffer storage. However, in those instances where a dedicated computer may be used, it may be desirable to store the channel not on the loop in the computer itself. The latter arrangement requires a greater amount of transfer of data between the computer and the central station, thus in those instances where a computer has substantial usage other than in the communications system, it may be desirable as in the illustrated embodiment to store the channels not on the transmission loop at any given instance in a separate core storage or other type of storage device within the central station. How this is accomplished will appear from the description which follows.

The arrangement previously described provides channels having two rates. Channels 1 through 8 are transmitted at a first high-speed rate. Channels 9, 10, 11, 12 and 13 are transmitted at a second much slower rate. This arrangement was selected to provide channels suitable for different terminal devices. Channels 1 through 8 are used primarily for transmitting data from badge readers, card readers, keyboards, etc., to the central terminal. Channels 9 through 13 are much slower and are used for transmitting data from the central to the various terminal complexes to terminals such as printers, clocks displaying time of day, etc. It would have been entirely possible to have utilized additional channels at different speeds, however, in the contemplated system, the high-speed and low-speed channels in the ratio selected have proved more than adequate for handling the data traffic available with the number of devices connected to the maximum system which included up to 100 terminal complexes each having as many as 30 to 40 terminal devices connected thereto.

Figures 4, 4B:
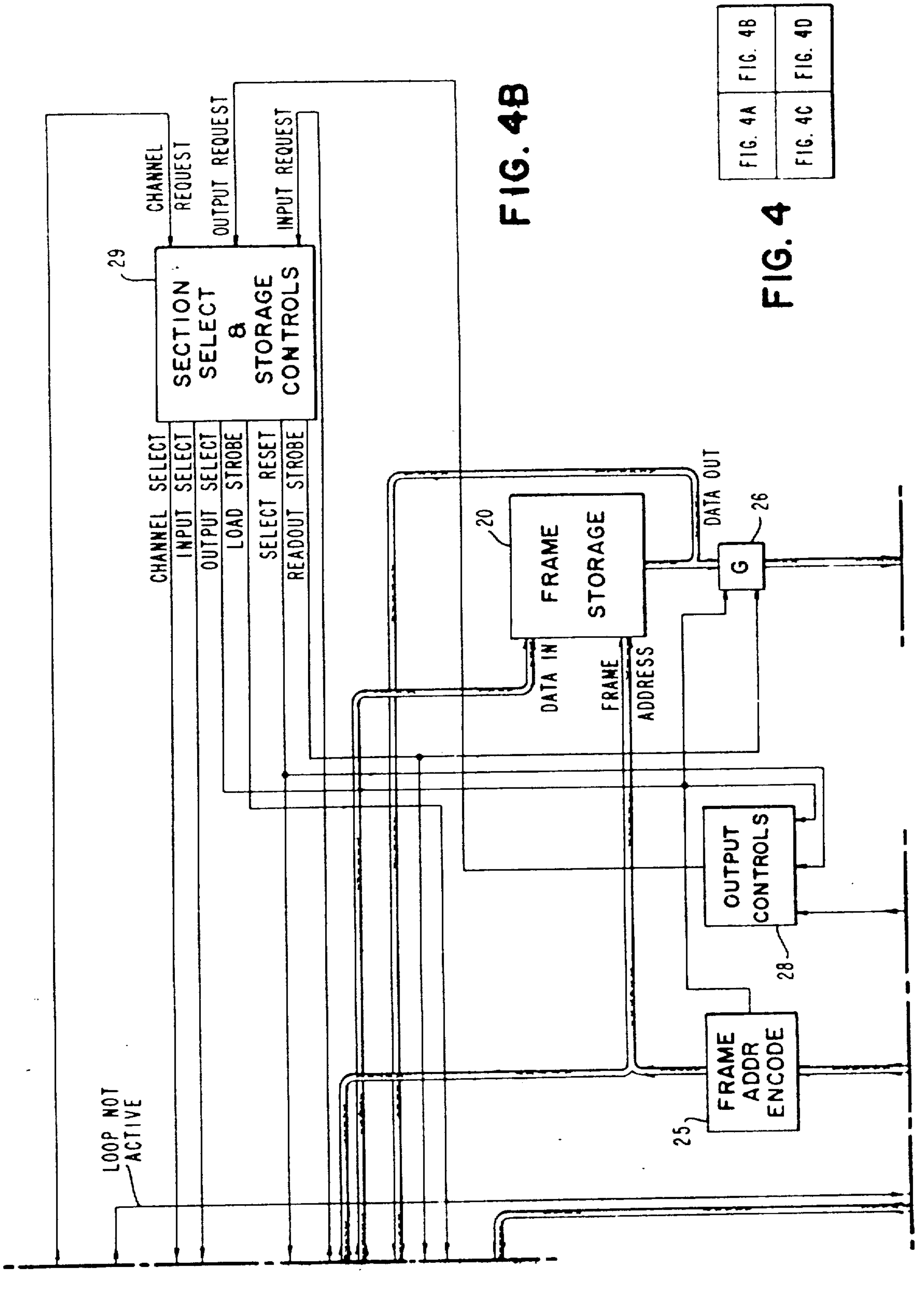
FIG. 4 shows the arrangement of FIGS. 4A–4D which together form a detailed block diagram of the system controller illustrated in FIG. 1.

FIG. 4 is a detailed block diagram of the control station 11 shown in FIG. 1 and includes the output section, the input section and the control section. The control section controls the flow of data to the output section for transmission to the various terminals connected to the serial transmission loop, the input section which receives the data from the last terminal on the transmission loop and the transfer of data between the computer and the control station. The central station as previously stated includes a frame storage means 20. Frame storage means 20 may be any conventional-type storage means and includes in accordance with the embodiment being described at least 13 unique storage addresses for binary coded data. Each of the addresses includes four bytes or units of data. Each byte including in the preferred embodiment eight binary bits. The 13 addresses in frame storage unit 20 may be accessed by the computer and the input and output sections of the control station.

The control section includes an oscillator 21 which provides stepping pulses at a relatively well controlled rate to an output bit counter 22 which may be any type of conventional bit counter providing $m$ bits, in the illustrated embodiment 8. These eight bits correspond to the bit times in a single eight-bit byte. Bit 1 is applied to an output byte counter 23 and steps this counter each time bit 1 is present. Output byte counter 23 contains $r$ positions, in the illustrated embodiment 30, since there are 30 bytes in a communications frame as previously described. Byte 1 of the frame is a start byte and designates the beginning of the frame. Bytes 2 and 3 are address bytes. Byte 4 is a control byte presenting control data. Byte 5 is a data byte which includes the data being transmitted either between the central and a remote or between the remote and the central. Bytes 6 through 30 are synchronizing bytes which are used to maintain synchronism within the various devices in the communication system and to provide separation between adjacent communications frames. The particular number in the described embodiment, that is 25 was selected to provide adequate time between frames for processing the data being transmitted. In faster systems, this number could be reduced. In slower systems, it might be necessary to increase the number if intermediate buffering within the central station is not deemed desirable.

The byte 1 count is applied to an output channel counter 24 and causes this output channel to count as previously described and illustrated in FIG. 3, i.e., the count precedes from 1 through 9 to 1 to 8 and 10 to 1 to 8 and 11 to 1 to 8 and 13. The output from the outputs from output channel counter 24 are applied to an encoding circuit 25 which includes standard logic, for encoding the address of a particular frame represented by the value attained by output channel counter 24. This code is applied when gated to the frame storage device 20 for reading one of the frames, i.e., the frame represented by the output of the frame address encoder circuit 25.

The frame designated by the code applied by frame address coder 25 is read out of frame storage and applied via a gate 26 to four static registers 27. This places a frame of data as defined by the frame address encoder 25 in the output section of the central station. The four bytes of data in the output frame register 27 must be shifted out serially. How this is done will be described below.

Previously described gate 26 controls the insertion of a frame into the output frame register 27. This is a control device for assuring that the correct frame is inserted in output register 27 and operates under control of an output control circuit 28 and a section select circuit 29.

The byte 6 output from output byte counter 23 controls the application of the information in the frame storage 20 to the output frame register 27 via gate 26. The byte 6 output is supplied to the output control circuit 28 which provides a control signal to the section selector and storage control circuit 29 via the line labeled "output request." There are three types of requests which may be made. One is a channel request. This is made when data must be transmitted from the channel output bus to the frame storage 20. An input request is made when data must be transferred from the input frame register of the input section to the frame storage 20 or when data must be transferred from storage 20 to the input frame register. Both of these operations will be described subsequently.

At this time the description will be limited to an output operation only.

The section select and storage control circuit 29 provides six distinct outputs. These will be described subsequently. For the purpose of an output operation, the output select line is utilized. This output causes the frame address encoder to be gated to the frame storage which causes a read operation in the frame storage 20 and causes the data in the addressed location to be applied to gate 26. The output select line from circuit 29 is also applied to gate 26 and operates the gate. The circuit 29, in addition, provides a strobe for readout at the appropriate time. The strobe is applied to the gate 26. It is also applied elsewhere. The other connections of the readout strobe will be described later in connection with other circuit operations. The details of circuits 28 and 29 will be described later in connection with the description of other figures. Thus with the readout strobe from circuit 29, the data available from frame storage 20 is inserted via gate 26 in output frame register 27.

Output frame register 27 is divided into the four sections corresponding to the four bytes of information contained in frame storage 20. Each of the four eight-bit data byte sections of register 27 are connected via appropriate gate circuit 27A–27D to an output shift register 30. Gate 27A is controlled by byte 2 from output byte counter 23. Gates 27B, C and D are controlled by bytes 3, 4, and 5 respectively. Thus, at byte 2 time, the contents of the first byte in register 27 is inserted in shift register 30, at byte 3 time, the contents of the second byte section of register 27 is inserted in shift register 30 and at byte 4 and 5 time, the third and fourth sections of register 27 are successively and respectively inserted in output shift register 30.

The output section of the control station includes a sync emit encoder circuit 31 and a start emit encoder 32. The sync encoder circuit 31 is provided with a gate circuit 33 while the start encoder circuit 32 is provided with a gate circuit 34. Gate 33 is controlled by bytes 6 through 30 and sync bytes are inserted in output shift register 30 during byte times 6 through 30 as defined by output byte counter 23. A start code from start encoder 32 is inserted in output shift register 30 via gate 34 which is under control of byte 1 output of output byte counter 23. This arrangement provides data formating as shown in FIGS. 2 and 3. The first byte coinciding with the byte 1 output of output counter 23 is the start code from start encoder 32 via gate 34 to output shift register 30. The second byte is the first byte in output frame register 27; the third byte, the second byte in register 27; the fourth byte, the third byte in register 27 and the fifth byte, the fourth byte in register 27. Bytes 6 through 30 are sync bytes provided by the sync encoder 31 and are applied to output shift register 30 via gate 33 during bytes 6 through 30.

Output shift register 30 is operated by oscillator 21, the output of which is applied to the shift input of the output shift register and causes the eight bits in output shift register to be shifted via a gate circuit 35 and a pulse driver 36 to a twisted pair of transmission lines which is connected to the first remote terminal complex on the loop. The loading of output shift register 30 from gates 27A through 27D, 33 and 34 is under control of the bit 1 output from the output bit counter 22. The shift pulse from oscillator 21 is also applied to gate circuit 35 for controlling and strobing the contents of the output shift register 30 appearing at the input of gate 35.

As previously described, the system provides 13 unique distinct channels. The output channel counter 24 contains 13 outputs which are energized in a fixed sequence illustrated in FIG. 3. The 13th channel appears every 45 frames. It is desirable at this time for synchronization purposes to insert a unique code which may be detected at the input section to the central station. This is done by inserting two start signals from start encoder 32 to accomplish this. The channel 13 indicia from output channel counter 24 is applied to an AND-circuit 37 along with byte 30 from the output byte counter 23. The output of AND-circuit 37 is applied to gate 34 via an OR-circuit 38 which also applies the byte 1 output of output byte counter 23. Thus every complete cycle, that is on the occurrence of channel 13, a start-start code, is inserted in the output shift register 30 and sent on to the twisted pair transmission line and will be received at the input section. How this start-start code is utilized will be described later in connection with the input section of the central station. When the additional start code is inserted in the stream of data being sent out over the twisted pair via output shift register 30, it must replace a sync byte from sync encoder 31. This is achieved by inverting the output of AND-circuit 37 in an inverter 37I and ANDing it in AND-circuit 39 with the bytes 6 through 30 outputs from output byte counter 23 previously described, thus inhibiting gate 33 for one sync byte time every 45th frame.

The serialized data from output shift register 30 passes through gate 35 and pulse driver 36 and is applied to a twisted pair transmission line which is connected to the very first terminal complex on the line. Data is received by the first terminal complex as shown in FIG. 1 and passed on either altered or unaltered as the case may be and traverses each of the terminal complexes in this manner. The altered or unaltered data as the case may be is returned via the twisted pair from the last terminal complex on the line to a pulse terminating circuit 40. The description will proceed with the remainder of the central station at this time and the description of the handling of data out on the loop will be deferred until the description of FIG. 5 which shows a detailed block diagram of one of the terminal complexes. At that time, the various types of data which are sent and received will be considered.

Pulse terminator 40 is connected to a clock derivation circuit 41 which produces pulses for synchronizing a clocking section which includes an input bit counter 22A, an input byte counter 23A, an input channel counter 24A and a frame address encoder 25A. Circuits 22A, 23A, 24A and 25A are identical in all respects to circuits 22, 23, 24 and 25, respectively, previously described. However, they are not synchronous in operation with circuits 22, 23, 24 and 25 but are synchronized to the derived clock from circuit 41. Their function will be described hereafter. However, each of the circuits provides the same output and operates in substantially the same manner as the previously described circuits.

The data at pulse terminator 40 and the derived clock pulses from circuit 41 are both applied to input shift register 42 which receives the serial bits on the line. Data is shifted in bit by bit and eight successive bits are simultaneously available at all times in the input shift register 42. The outputs of the eight positions of the shift register are connected to various circuits which will be described below and the function of each will be described in detail.

The contents of the input shift register 42 are applied to a sync decode circuit 43 and to a start decode circuit 44 for generating synchronization of the input bit counter and input byte counter respectively with the bits and bytes of the incoming frames received on the twisted pair transmission line. In addition to the data from the input shift register, the derived clock pulses are applied to sync decode circuit 43 as well as the output of the input byte counter position 6 through 30. In addition, the output of start decode circuit 44 is applied to the sync decode circuit. The sync decode circuit provides two outputs. Whenever sync is decoded at the appropriate time as will here and after be explained, the input bit counter 22A is reset, thus causing bits 1–8 in the illustrated embodiment to be generated in sequence. Sync decode circuit 43 also provides a gating pulse to start decode circuit 44, thus, start decode circuit 44 will not search for start until sync has been achieved.

The sync decode circuit 43 examines the data and the derived clock pulses which act as strobe pulses along with the 6–30 byte outputs and the bit 8 pulse. If the device is out of synchronization, it examines the contents of input shift register 42 every bit time. However once synchronization is achieved, it examines the contents of the input shift register 42 every eighth bit time during bytes 6 through 30 of the input byte counter. If no sync or start is present, the circuit operates on a bit-search basis, however when sync or start have been received, the contents of the input shift register are examined only at bit 8 time. The two outputs of the circuits provide synchronization with the received data. A start-start detector circuit 45 examines the start decode circuit output for two consecutive start code detections. These occur once every 45 frames during the 30th byte of the 45th frame. At this time, the input channel counter 24A is reset, thus synchronizing the input channel count.

Frame address encoder 25A is synchronized to the frames received on the twisted pair transmission line and accesses the frame in frame storage 20 corresponding to the frame previously sent from the output section. The frame from storage 20 is applied via the out data bus to a gate circuit 46 and at appropriate times to be described below inserted in the four sections of an input frame register 47.

Gate 46 is enabled similar to gate 26 in the output section. In a similar fashion to the output section, byte 6 of the input byte counter 23A is applied to an input control circuit 48 which generates an input request. This is applied to the section select and storage control circuit 29 previously described. Section select and storage control circuit 29 provides an "input select" output which is applied to the input control circuit 48, to gate 46 and the frame address encoder 25A thus causing the address in 25A to be applied to frame storage 20. The readout strobe from circuit 29 is also applied to gate 46 through synchronized gating at the appropriate time so that the data from the frame storage 20 is available when the gating function takes place. The data corresponding to the frame to be processed in the input section is placed in input frame register 47 so it can be compared at appropriate times with the data received at the input shift register 42 in various circuits. To this end, the four sections of input frame register 47 are controlled by gates 47A, B, C and D, respectively.

The terminal complex address section of the input frame register 47 is applied directly to a decoder circuit 49 which determines if the address contained in this byte is an ANY terminal complex address. If the address is an ANY address, an output is provided to a frame process control circuit 50 which interprets the data in a manner which will be described below. The third section of input frame register 47 defining the control byte is applied directly to a command decoder 51 which provides an output for each of the valid commands utilized in the system. These outputs are applied to the frame process controls circuit 50.

The eight bits comprising the fourth byte in input frame register 47 which is the fifth byte of the frame in process is connected directly to the computer channel input bus via a gate circuit 52 which is under control of the computer via the channel interface controls circuit which are part of the computer channel interface. Gate 52 is operated under control of the computer and under computer control sends the data byte portion of the frame in process to the computer via the channel input bus. Gates 47A through 47D are connected to an exclusive OR-compare circuit 53 which is sampled at bit 8 time. The compare circuit provides a compare or a no compare output depending upon whether the contents of the input shift register 42 compare with the contents of the various sections of the data contained in input frame register 47 at the eighth bit time. The compare and no compare outputs respectively of the exclusive OR-compare circuit 53 are applied to frame process control circuit 50.

Frame process control circuit 50 performs a number of logic functions. It accepts the inputs illustrated and provides the outputs illustrated. The logical function may be implemented with conventional circuits. A detailed description of this circuit will be provided at a later time. The data in input shift register 42 is also applied to a command response decoding circuit 54 which is sampled at bit 8 time as is exclusive OR-compare circuit 53. In addition, the output provided by the response decode circuit 54 is gated to a command translate and hold circuit 55 at byte 4 time which corresponds to the control byte in the third position of the input frame register 47. Thus, the response decode circuit 54 indicates to the command translate and hold circuit 55 and to the frame process controls, the response control byte supplied by the terminal complex and the terminal connected thereto to the outgoing control byte which is also contained in input frame register 47. The command translate and hold circuit 55 provides a first output which indicates whether or not the response command supplied by the terminal at the addressed complex was valid or invalid by an output on the command OK line. If the response is invalid, this line will not provide an output to the frame process control circuit 50. If the response is valid, the new command or next command in the sequence of transmission will be supplied over a line to a gate 56C which has its output connected to the third byte section of the input frame register 47. This places the new command in that position in the register in place of the command previously sent with the frame in process to the terminal connected to the addressed terminal complex. Gate 56C is enabled at byte 6 time from the byte 6 output of the input byte counter 23A. Thus, at byte 6 time, the new command provided by the command translate and hold circuit is inserted via gate 56C into the third byte section of the input frame register 47.

Input shift register 42 is connected to the first, second and fourth byte sections of the input frame register 47 via gates 56A, B and D. These gates are controlled by various timing pulses for inserting the data received from the twisted pair transmission line via pulse terminator 40 and residing in input register 42 into the first, second and fourth sections of the input frame register 47 to construct the next frame which will be sent to the terminal. Thus, as a frame is received from the transmission line by the input section, the next frame to be transmitted by the output section is prepared in the input frame register 47.

The frame previously sent as described above is inserted in input frame register 47 compared with the received frame and the next frame to be sent out is constructed at this time and placed in the input frame register. Once the frame is constructed, the four bytes are transmitted via the gate 57 to the input of frame storage 20. Gate 57 is controlled by two additional inputs. The controls for gates 56A, B, D and for gate 57 will now be described.

Gate 56A is under the control of byte 2 from input byte counter 23A, bit 8 from input bit counter 22A and gate address from the frame process control circuit 50. Gate 56B is under the control of byte 3 from the input byte counter 23A, bit 8 from input bit counter 22A and gate address from the frame process control circuit 50. Gate 56D is under control of byte 5 from the input byte counter 23A, bit 8 from the input bit counter 22A and gate data byte from the frame process control circuit 50. It should be noted that the gate address from frame process control circuit 50 is used for both gates 56A and B since gates A and B control the two byte sections within the input frame register 47 which deal with address information, i.e., terminal address and device address at the terminal complex. Gate 57 is under the control of input select and load strobe from the section select and storage control circuit 29.

An additional data path into the fourth or data byte section of the input frame register 47 is provided. This path connects the computer output bus through a gate 58 directly to the fourth data byte section of the input frame register 47. Gate 58 is under the control of the computer channel interface control section. The alternate route for entering data into the fourth or data byte section of the input frame register 47 is provided to permit the computer to send data to the terminal.

An error checking technique is employed in which the transmission of data from a remote terminal to the computer is duplicated, i.e., the data is transmitted twice. On the second transmission, the data is compared in the exclusive OR-compare circuit 53 and the data character ready line from the frame process controls control the sending of the data as previously described via gate 52 back to the computer.

The path which includes gate 58 is used in the writing mode to control the introduction of new data from the computer into the frame in process when requested by the addressed terminal. When this request is made, the computer inserts the next data byte to be sent to a printer at a remote terminal complex into byte 4 of input frame register 47. The data is then inserted in frame storage 20 as previously described and outputed as previously described. When the printer is ready for another data byte, the data character request line from the frame process controls circuits 50 informs the computer that the next data byte for that particular loop channel is required. This is accomplished under control of the computer channel interface control circuit.

In order to inform the computer as to which channel is in operation, the outputs from the input channel counter 24A are applied to a loop channel address encoder 59 which is under control of a gate signal from the computer channel interface control circuit. A loop channel address encoder such as 59 is employed since the address code sent to the computer differs from the frame address utilized to operate frame storage 20. The computer when inserting data for this purpose would utilize the loop address if this particular channel is to be employed. The particular use of this information will, of course, depend to a great extent on the particular control program employed in the computer. Since the control program employed by the computer is not part of the communication system, no further description will be made.

Error detection in transmission is accomplished in the input section described. Frame process control circuit 50 analyzes the data supplied by the command decode circuit 51, the exclusive OR-compare circuit 53, decoder 49 and response decode circuit 54 and determines from this data if an error has occurred in transmission. If an error has occurred frame process control circuit 50 signals this error to the computer via an error line which is transmitted to the computer through the channel interface control circuit. The computer control program determines the corrective measures to be taken, i.e., retransmission, or signalling for outside help. The particular corrective action taken is not pertinent to the communication system and therefore no further description will be made.

Frame activation in the frame storage 20 is under computer control and means are provided for inserting data within the frame storage 20 from the computer. The channel output bus is connected by a first gate 60 to a channel frame register 61. Channel frame register 61 is connected via a gate 62 to the data input bus of frame storage 20. Channel frame register 61 is four bytes wide and is identical in format to input frame register 47 and output frame register 27. Gate 60 is under control of the gate frame output control line from the computer channel interface control section and gate 62 is controlled by a channel select line and the load strobe line from the section select and storage control circuit 29. The input of data is initiated by the computer by signalling a channel request to the section select and storage control circuit 29 from the computer channel interface controls section.

In addition, the computer channel output bus is connected by a gate 63 to a loop channel address register 64 which is connected by a frame address encoding circuit 65 to the frame addressing bus which addresses the frame storage 20. Gate 63 is controlled by the gate address from the computer channel interface controls while gate 65 is controlled by the channel select line from the section select and storage controls 29. Thus when data from the computer is to be entered into frame storage 20, the computer signals this to the section select and storage control circuit by activating the channel request line and presenting the address and the information of the channel output bus at the appropriate time and operating gates 60 and 63 at appropriate times to put the information in register 61 and 64. At the appropriate time in the cycling, the section select and storage control circuit 29 transfers the data in register 61 and the address contained in register 64. Here again, an encoding function is performed in circuit 65 to secure the correct address in the frame storage 20.

Figure 5:
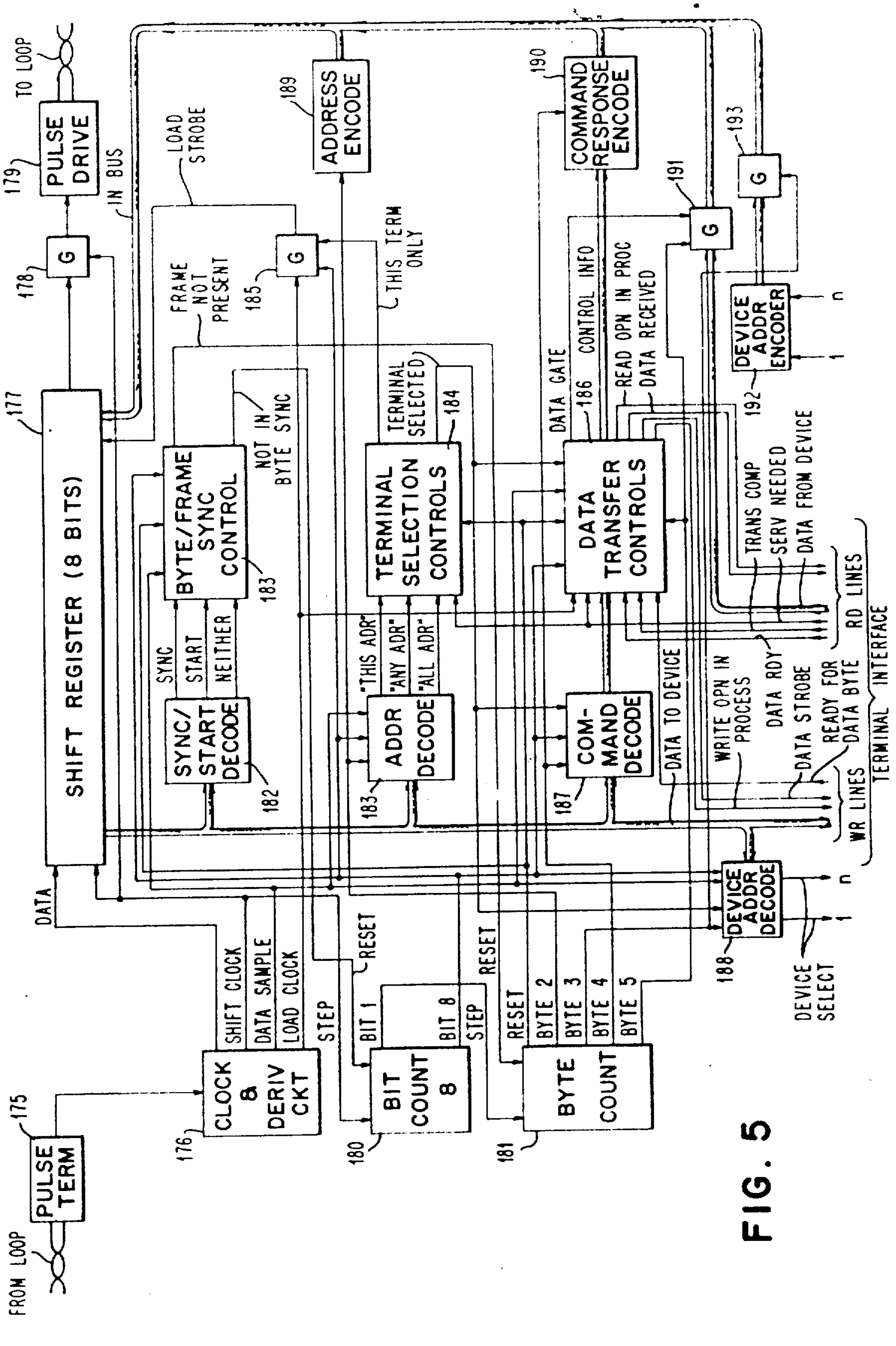
FIG. 5 is a detailed block diagram of a single terminal complex shown in FIG. 1, FIGS. 6 and 7 are flow diagrams illustrating writing and reading sequences suitable for use in the communications system illustrated.

A description of a typical terminal complex shown in FIG. 5 will be deferred until the components described above have been considered in detail. These are shown in FIGS. 8 through 20.

Figure 8:
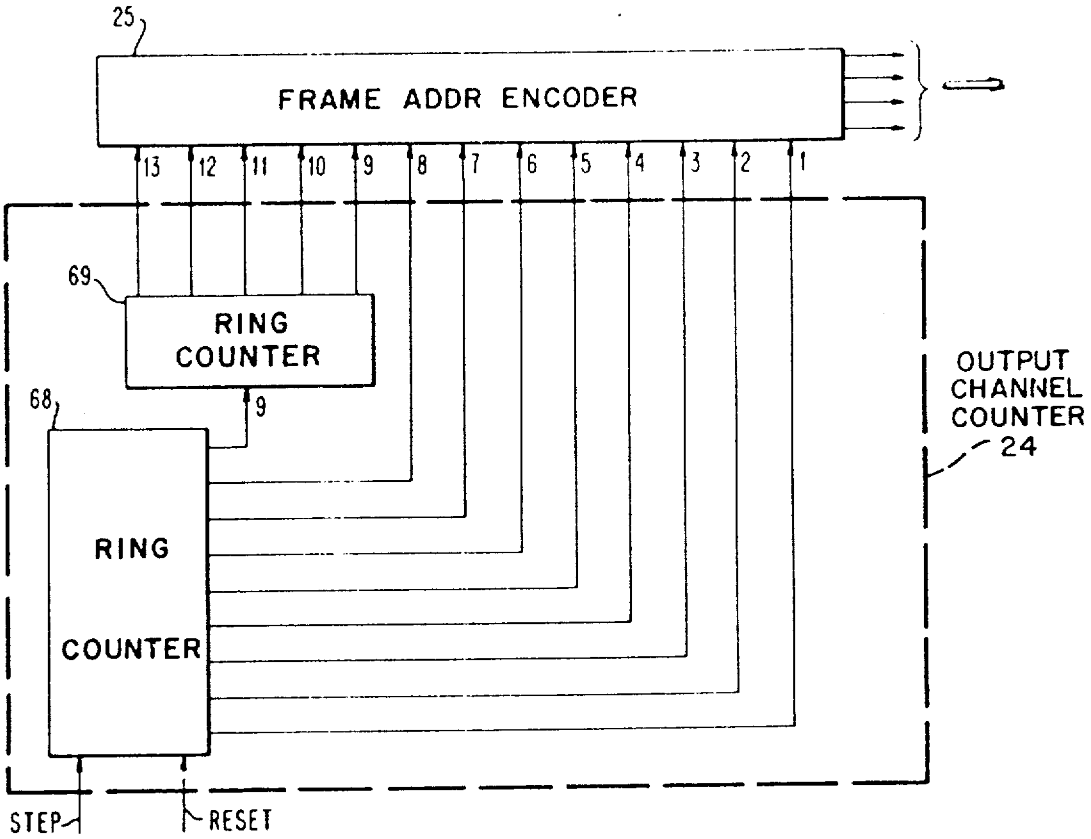

FIG. 8 illustrates an embodiment of the output channel counter 24 for achieving the sequence of 13 channels described above. In the illustrative embodiment, a ring counter 68 with nine positions is stepped by the byte 1 output of the output byte counter 23. Positions 1 through 8 of ring counter 68 are connected to the frame address encoder 25 and each time the ring counter 68 activates one of these lines, the address encoder 25 provides a corresponding address to frame storage 20 for accessing the information at that location or inserting information in that location as required. The ninth position of ring counter 68 is connected to a second ring counter 69 which is provided with five positions. The five positions provide the outputs 9 through 13; thus on the first cycle of ring counter 68, the first position of ring counter 69, corresponding to the ninth channel or frame, is generated. On each successive cycle of ring counter 68, the outputs 10, 11, 12 and 13 are generated. Many other arrangements are possible; however, the illustrated ones will prove quite adequate for generating the channel indicia which is applied to the frame address encoder 25 for accessing frame storage 20.

Figure 9:
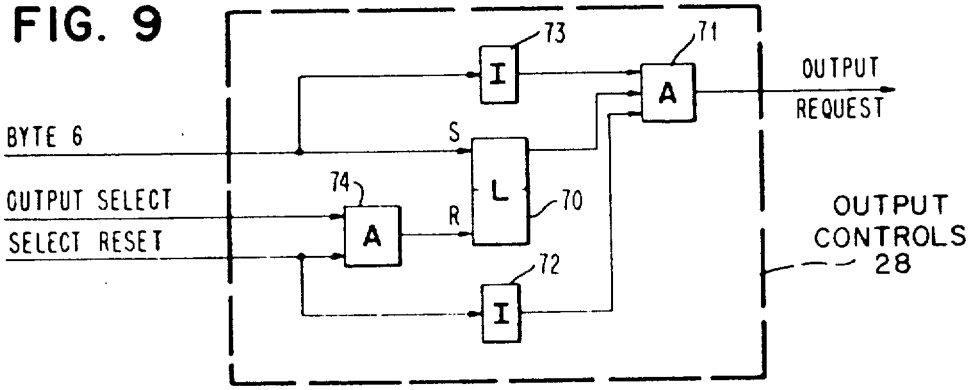

The details of output control circuit 28 are illustrated in FIG. 9. The same outputs and inputs illustrated in FIG. 4 are shown here. Byte 6 from output byte counter 23 is applied to the set input of a latch 70. When latch 70 is set, it enables an AND-gate 71 provided the select reset signal from section and select storage control 29 is not present. The select reset line is inverted in an inverting circuit 72 to attain this condition. Byte 6 output is inverted in another inverter 73 and applied to the AND-gate 71 to cause the output request to come up on the trailing edge of byte 6. The latch 70 is reset by the output select and select reset from circuit 29. These are combined in an AND-gate 74, the output of which is connected to the reset input of the latch 70.

Figure 10:
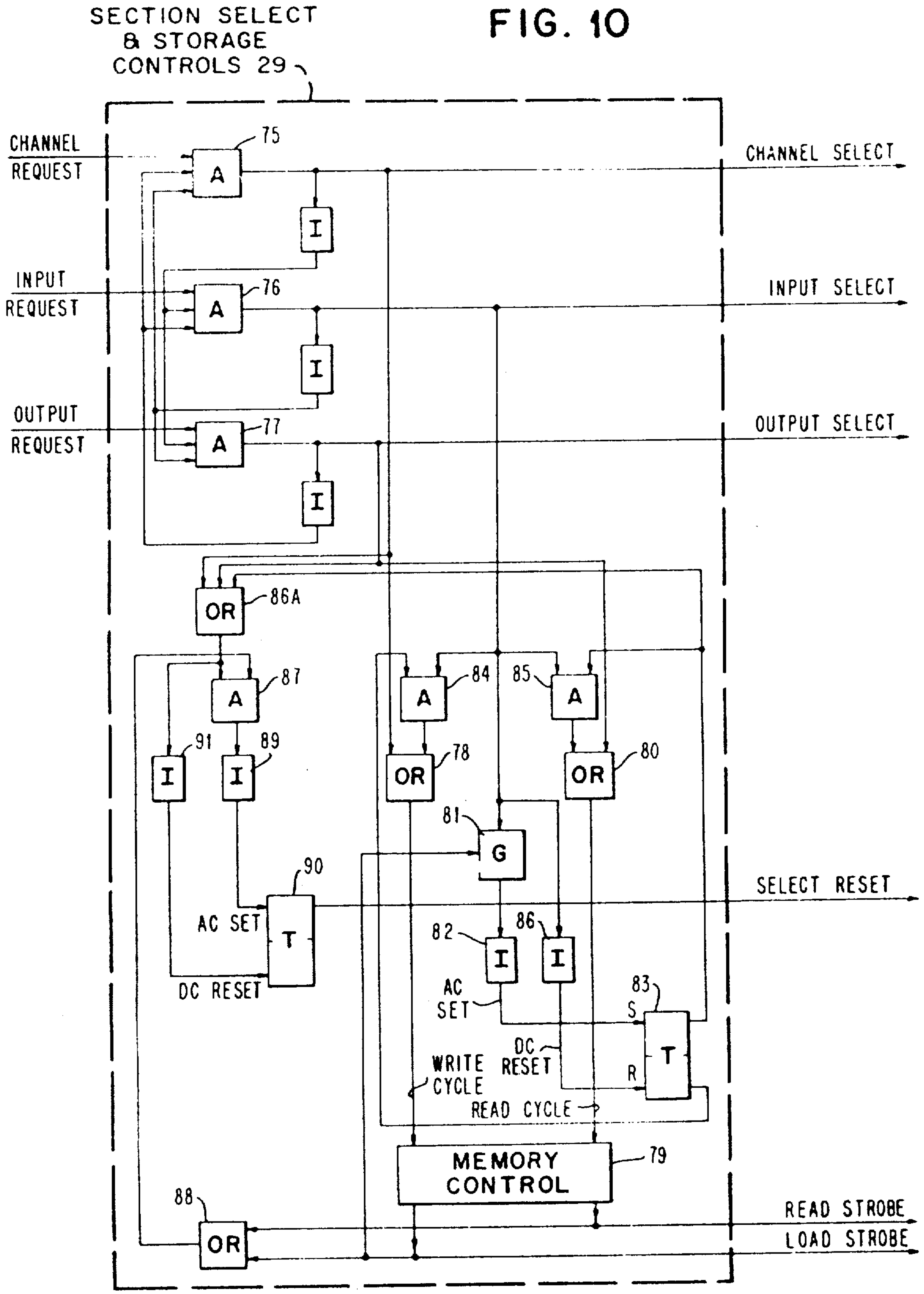

The details of section select and storage control circuit 29 are shown in FIG. 10. The channel request, input request and output request lines are applied to AND-gates 75, 76 and 77 respectively. These gates provide channel select, input select and output select outputs previously described. The outputs of each of the AND gates are inverted and applied to the other two AND gates to inhibit these AND gates as soon as one of the signals channel request, input request or output request comes up and seizes the circuit. Thus, if a channel request comes up the inverted output of AND-gate 75 inhibits gates 76 and 77, likewise the inverted output of AND-gate 76 inhibits gates 75 and 77 and the inverted output of AND-gate 77 inhibits gates 75 and 76. When a channel request comes up, the storage control circuit portion of circuit 29 request a write cycle, therefore the channel select line is connected by an OR-gate 78 to the write cycle input of a conventional memory control circuit 79 and causes a memory cycle to be taken for the frame storage memory. When an output request is made, a read cycle is necessary and the output select line is connected via an OR-gate 80 to the read cycle input of memory control circuit 79. An output request as previously described is only made when the data in the frame has been assembled. This request requires both a write cycle and a read cycle. The write cycle is first used to put the data into the proper address, then the next address in the memory is read into the input frame register 47.

The sequential write-read cycle is controlled by the input select line. This is connected via a gate 81 and an inverter 82 to the AC set input of a trigger 83. The line is also connected to a pair of AND-gates 84 and 85. In addition, it is connected by an inverter 86 to the DC reset input of trigger 83. The set output of trigger 83 is connected to AND-gate 85 and the reset output of trigger 83 is connected to AND-gate 84. AND-gate 84 has its output connected via OR-gate 78 to the write cycle input of memory control circuit 79 while AND-gate 85 has its output connected via OR-gate 80 to read cycle input of the memory control circuit 79. The trigger 83 is normally reset at the beginning of any cycle, thus enabling AND-circuit 84. When the input select line is activated, AND-gate 84 provides an output via OR-gate 78 which requests the write cycle. As soon as the write cycle is completed, a load strobe signal is generated by the memory control. This signal enables AND-gate 81 which via inverter 82 causes the AC set to occur on trigger 83 at the trailing edge of the pulse. Trigger 83 provides an output on the set output which now enables gate 85 causing the read cycle to occur. The natural time delays between the read and the write cycle are sufficient for the normal stepping of the input channel counter to thus access the next frame in storage which will be coming in on the line at a later time.

The set output of trigger 83, output select, and channel select are connected via an OR-circuit 86A to one input of an AND-gate 87. The other input of AND-gate 87 is connected via an OR-circuit 88 to load strobe and read strobe from memory control circuit 79. Thus, following the occurrence of either load strobe or read strobe and the channel select, output select or the setting of trigger 83 the select reset is generated. This is accomplished via an inverter 89 connected between the output of AND-circuit 87 and the AC set input of another trigger 90 which provides the select reset output. An inverter 91 is connected between the output of OR-circuit 86A and the DC reset input of trigger 90 causing a reset of this condition when any of the above conditions which initiated the setting of the trigger ceases to thus restore the circuit for the next cycle of operation.

Figure 11:
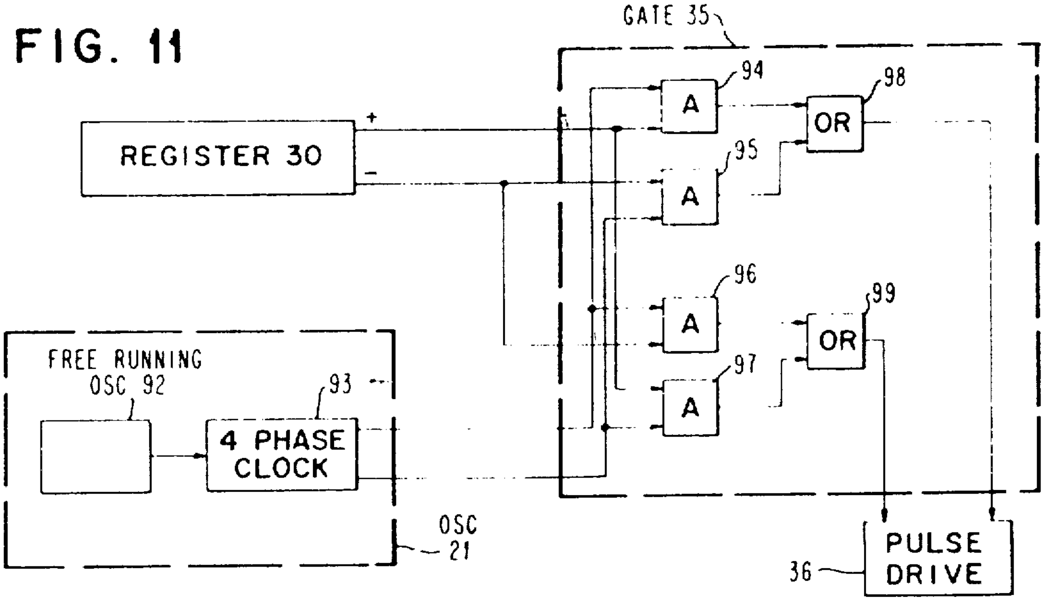

FIG. 11 illustrates the details of oscillator 21 and gate circuit 35. Oscillator 21 includes a free running oscillator 92 driving a four-phase clock generator 93 of conventional design. Only two adjacent phases of the four phases available are utilized. The additional two are used for time separation. The positive and negative outputs from the last stage of register 30 are applied to four AND-gates 94, 95, 96 and 97. The two phases are connected to these AND gates in the manner illustrated. The outputs of AND-gates 94 and 95 are connected via an OR-circuit 98 to one input of the pulse driver circuit 36 while the outputs and AND-gates 96 and 97 are connected via an OR-circuit 99 to the other input of pulse driver 36. With this arrangement, if a one is stored in the last position of register 30, one of the outputs is plus and the other is negative. Thus, the gate connected to the plus output 94 and 97 illustrated in FIG. 11 are enabled and gate 94 passes from the first clock pulse via OR-gate 98 to the input of pulse driver 36 and the second pulse from the four-phase clock 93 is passed via gate 97. If the last position of register 30 stores a 0, the polarities indicated on the drawings would be reversed, and gates 96 and 95 would have been enabled, the first pulse from the four-phase clock 93 would have been passed via gate 96 and OR-gate 99 to the latter input of pulse driver 36 and then the second pulse would have been passed gate 95 and OR-gate 98 to the former input of pulse driver 36 to produce bipolar pulses which are phase sensitive for indicating ones and zeros. The two segments of the four-phase clock which are not utilized are to provide a neutral or reference level between successive bits transmitted on the line. That is, during the two phases of the clock which are not utilized, pulse driver 36 is at a reference voltage level which is 0 volts in the case illustrated and the bipolar pulses defining each bit position are provided with either a positive-negative reference or a negative-positive reference depending upon whether a 1 or a 0 is being transmitted.

Figure 12:
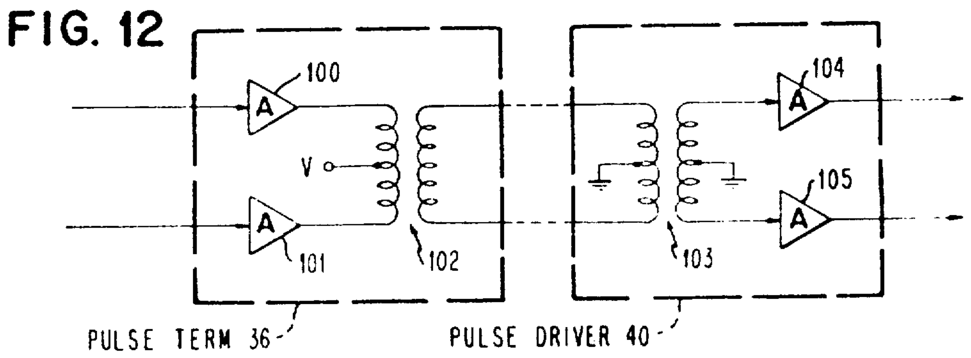

FIG. 12 is a schematic diagram of the pulse driving circuit 36 and pulse terminating circuits 40. The loop section in between is not illustrated in this Figure. The outputs from OR-gates 98 and 99 are applied to a pair of amplifiers 100 and 101 respectively. The outputs of the amplifiers are connected to a center tapped primary winding of a coupling transformer 102. The center tap of the primary winding is connected to a bias potential source. The secondary of transformer 102 is connected to a primary winding of another transformer 103 via the external loop. The secondary of transformer 103 has a grounded center tap and the ends of the secondary are connected to a pair of amplifiers 104 and 105 respectively. During a single bit time either OR-gate 98 or 99 provide an output to the pulse driver 36 first followed by an output from the other which is then followed by a period when neither provide an output. When one of the outputs provided by the two gates is present, the amplifier connected thereto conducts causing a pulse of predetermined polarity to appear on the secondary of transformer 102. When the other amplifier conducts, a pulse of opposite polarity appears. When neither amplifier is conducting, the line is at ground potential due to the connection of the center tap on the primary winding of transformer 103. The pulse terminator operates in a like manner. When one side of the secondary winding is positive, the amplifier connected to that side will conduct and when the polarity reverses the amplifier connected to the other side will conduct, thus providing an indication of the phase of the signal on the line by the timing of the outputs from the amplifiers 104 and 105.

Figure 13:
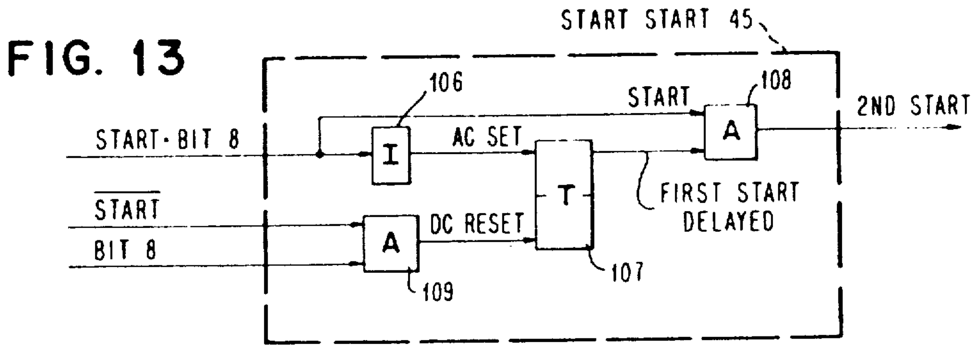

FIG. 13 illustrates in detailed block form start-start circuit 45. Start decode circuit 44 provides a first output line indicating start and the coincidence of bit 8. This signal is applied via an inverter 106 to the AC set input of a trigger circuit 107. The output of the trigger circuit 107 is applied to an AND-circuit 108. The start and bit 8 line from the start decode circuit 44 is also directly applied to AND-circuit 108, thus trigger 107 is set by the trailing edge of a first start signal and a subsequent start signal is passed by the AND-gate 108 which is enabled to indicate a second start signal following the first start signal. These must be consecutive signals since trigger 107 is reset by the not start output from start decode circuit 44 and bit 8 combined in an AND-circuit 109 and applied to the DC reset input of trigger 107.

Figure 14:
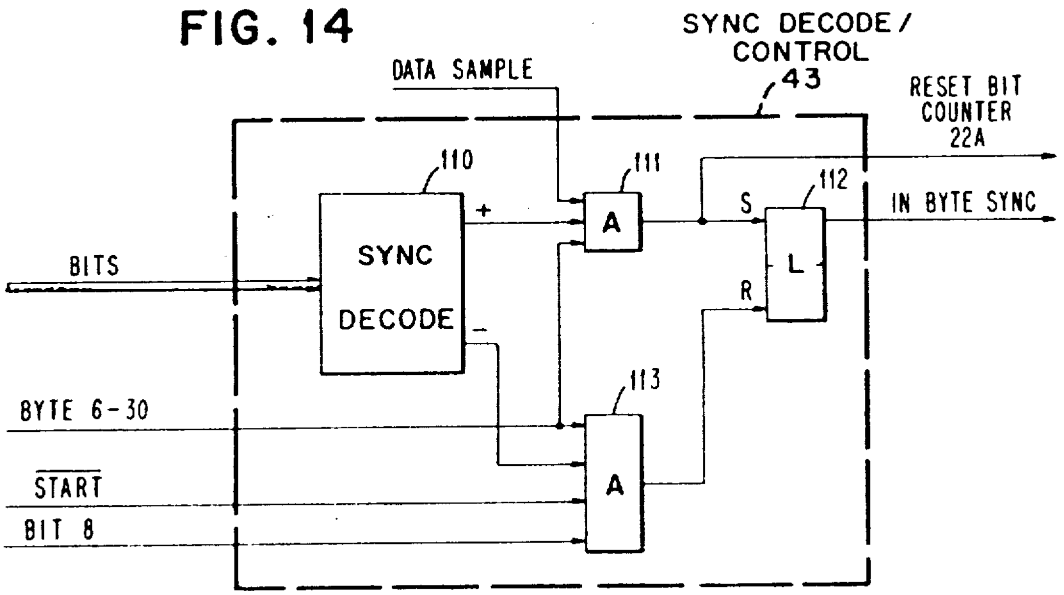

FIG. 14 is a detailed block diagram of sync decode/control circuit 43. The parallel lines from the input shift register 42 are applied to a sync decoding circuit which provides a first output labeled plus whenever the sync code is decoded and a second output on a line labeled minus at all other times. The plus line from sync decoder 110 is connected to one input of a three-input AND-gate 111. The other two inputs are connected to the data sample signal and bytes 6 through 30. Thus, when sync is present at the input to sync decoder 110 at data sample and during bytes 6 through 30, AND-gate 111 develops an output which sets a latch 112 to indicate that the unit is in byte synchronism. The output of AND-gate 111 is applied to reset the bit counter 22A. The not start signal, bytes 6 through 30 and bit 8 are applied to an AND-circuit 113 with the negative labeled line from sync decode circuit 110. When these conditions are satisfied, the output from AND-circuit 113 resets latch 112 thus indicating that byte synchronism has been lost.

Figure 15:
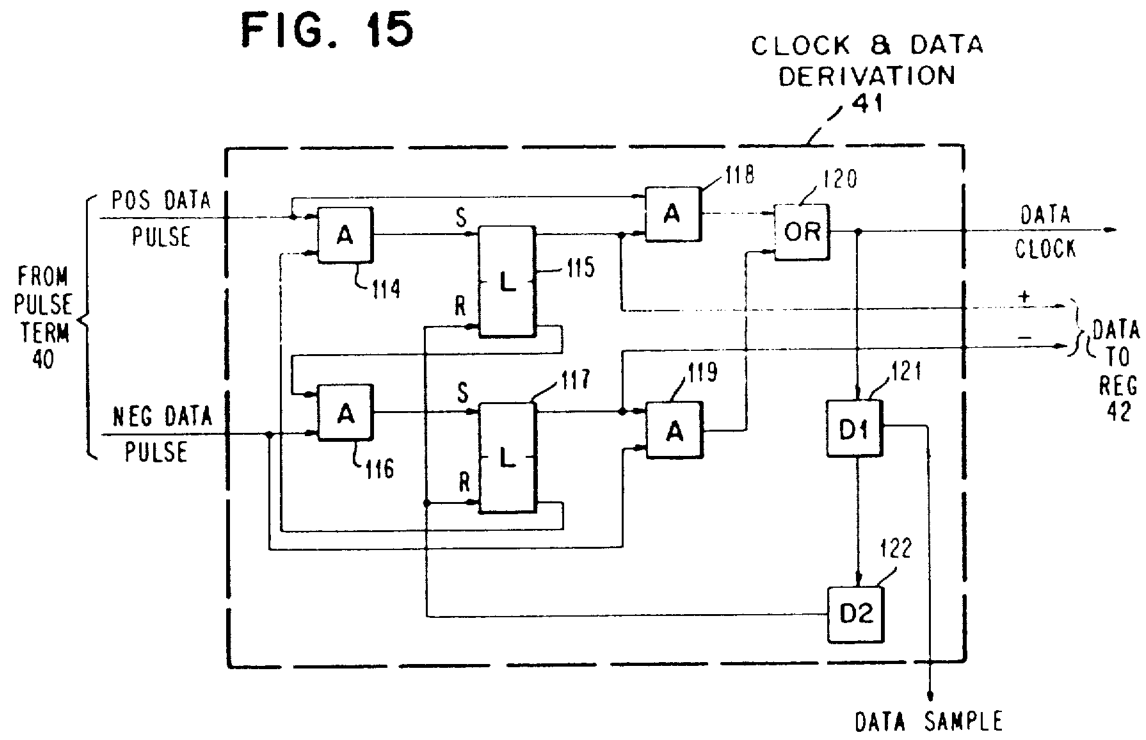

FIG. 15 is a detailed block diagram of the clock and data derivation circuit 41 shown in FIG. 4. Here positive data pulses are applied to an AND-circuit 114. The output of this AND circuit is connected to set a latch 115. The negative data pulses are applied to a similar AND-circuit 116 which has its output connected to set a latch 117. The reset outputs of latches 115 and 117 are connected to AND-circuits 116 and 114 respectively.

The set output of latch 115 and the positive data pulse from pulse terminator 40 are applied to the input of an AND-gate 118 while the set output of latch 117 and the negative data pulse from pulse terminator 40 are connected to the inputs of another AND-gate 199. AND-gates 118 and 119 have their outputs connected to an OR-circuit 120 which provide the data clock output. The data clock output is passed through a first delay unit 121 and a second delay unit 122. The output of delay unit 121 is the data sample signal. This is the data clock signal delayed. The output of delay unit 122 is utilized to reset latches 115 and 117. This circuit provides a data clock pulse at the output of OR-circuit 120 upon the arrival of the first pulse whether it be a positive or a negative pulse. The data sample is delayed a fixed amount and the reset occurs a fixed amount thereafter.

Figure 4A:
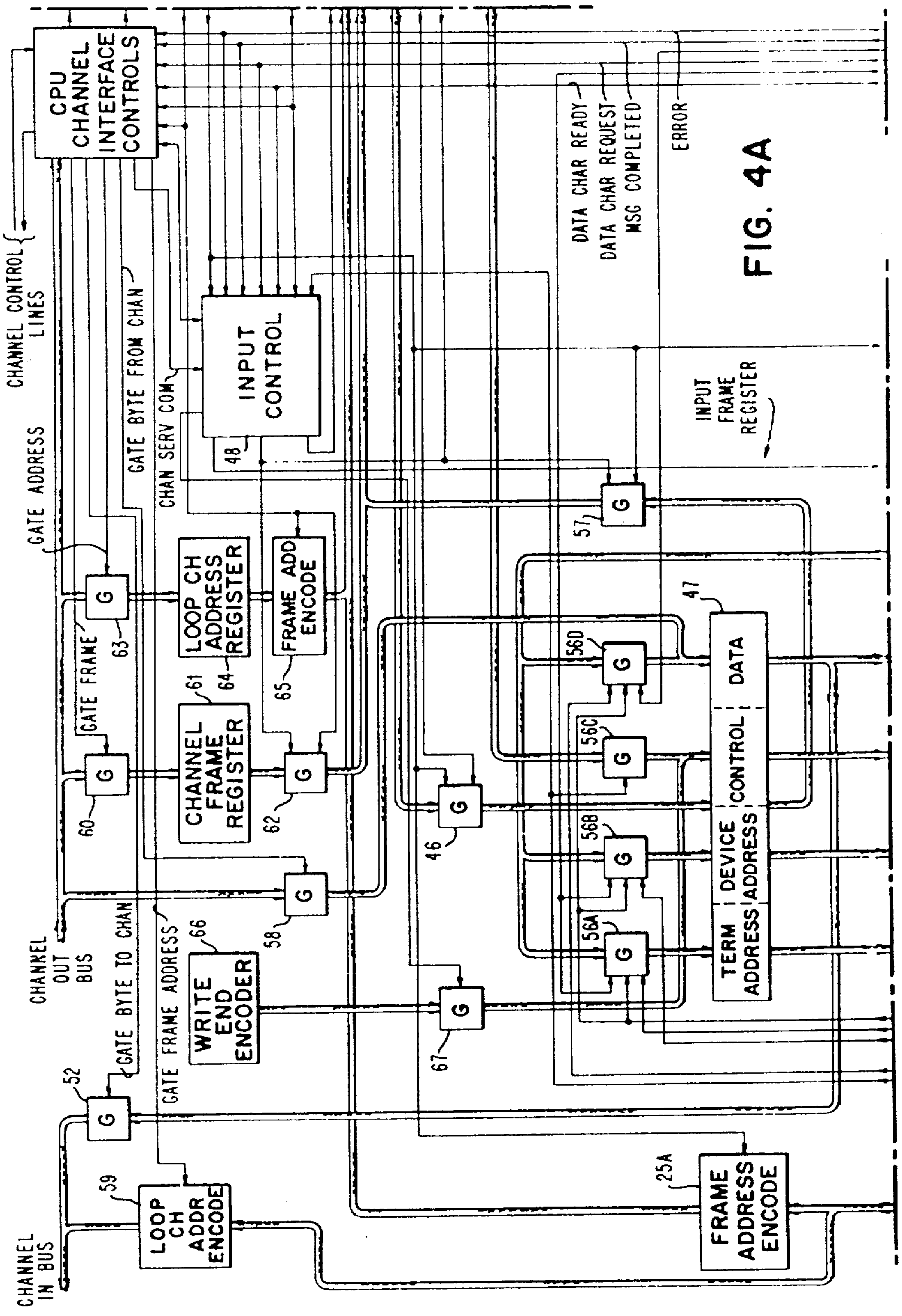
Figure 4C:
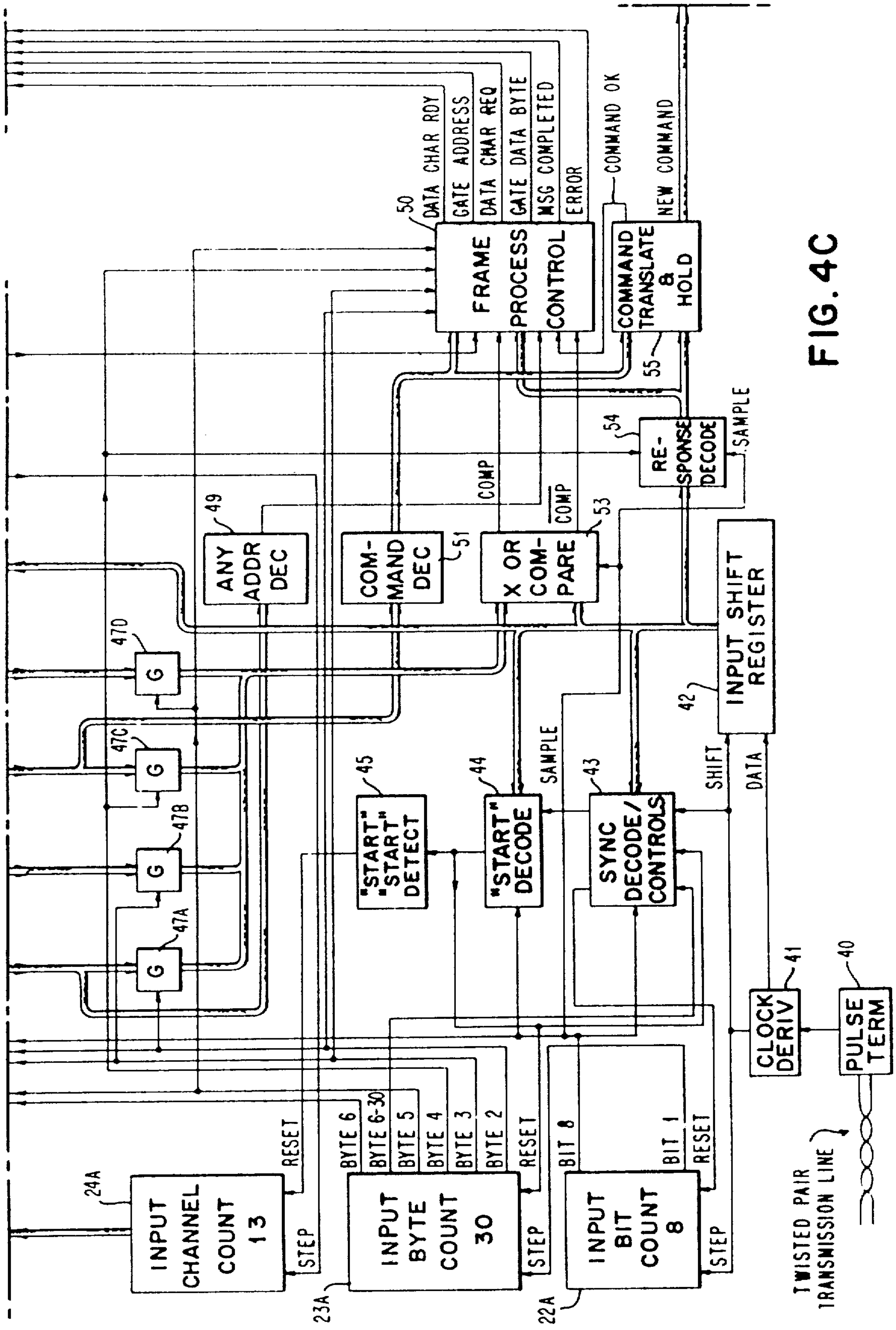
Figure 4D:
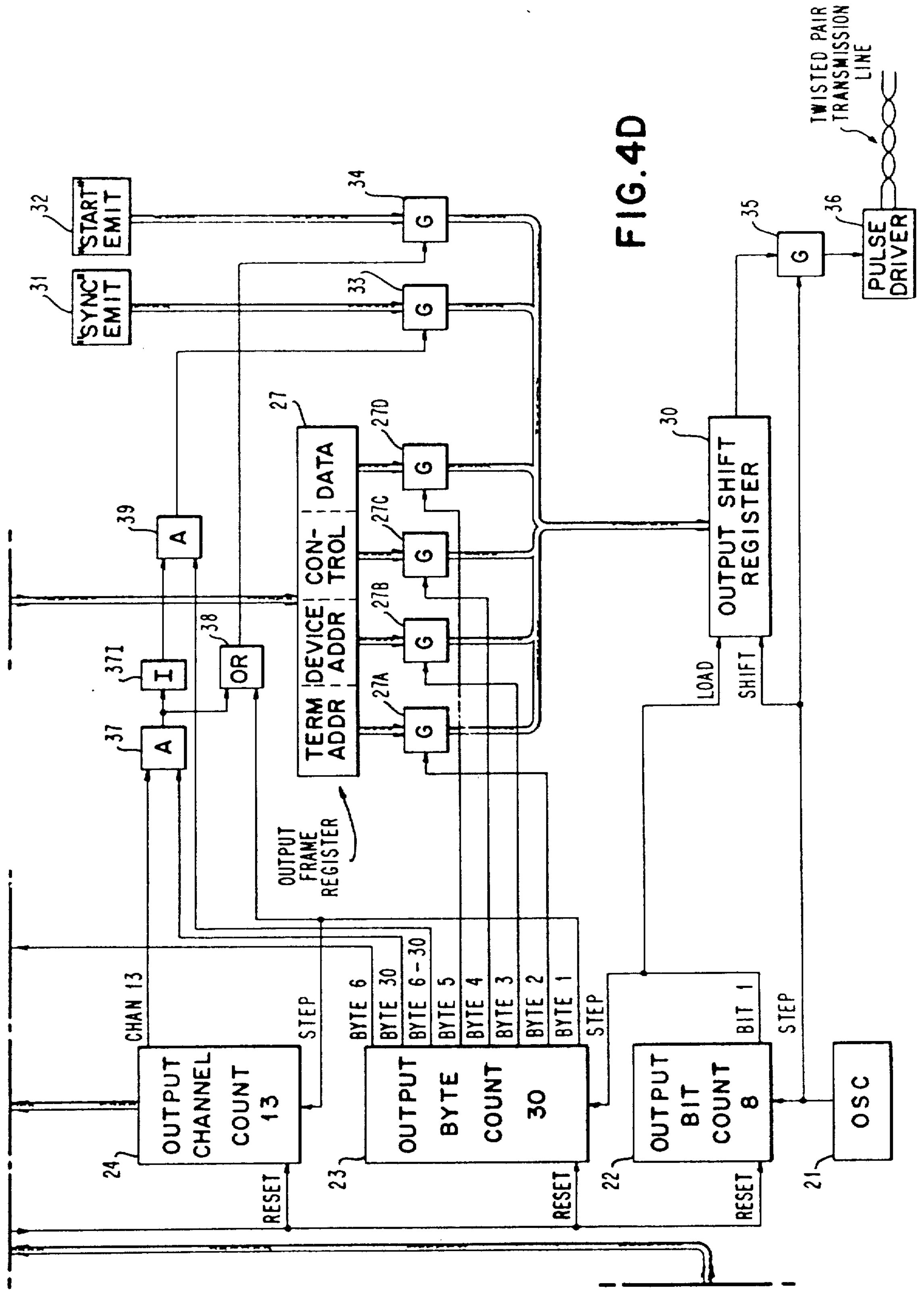
Figure 16:
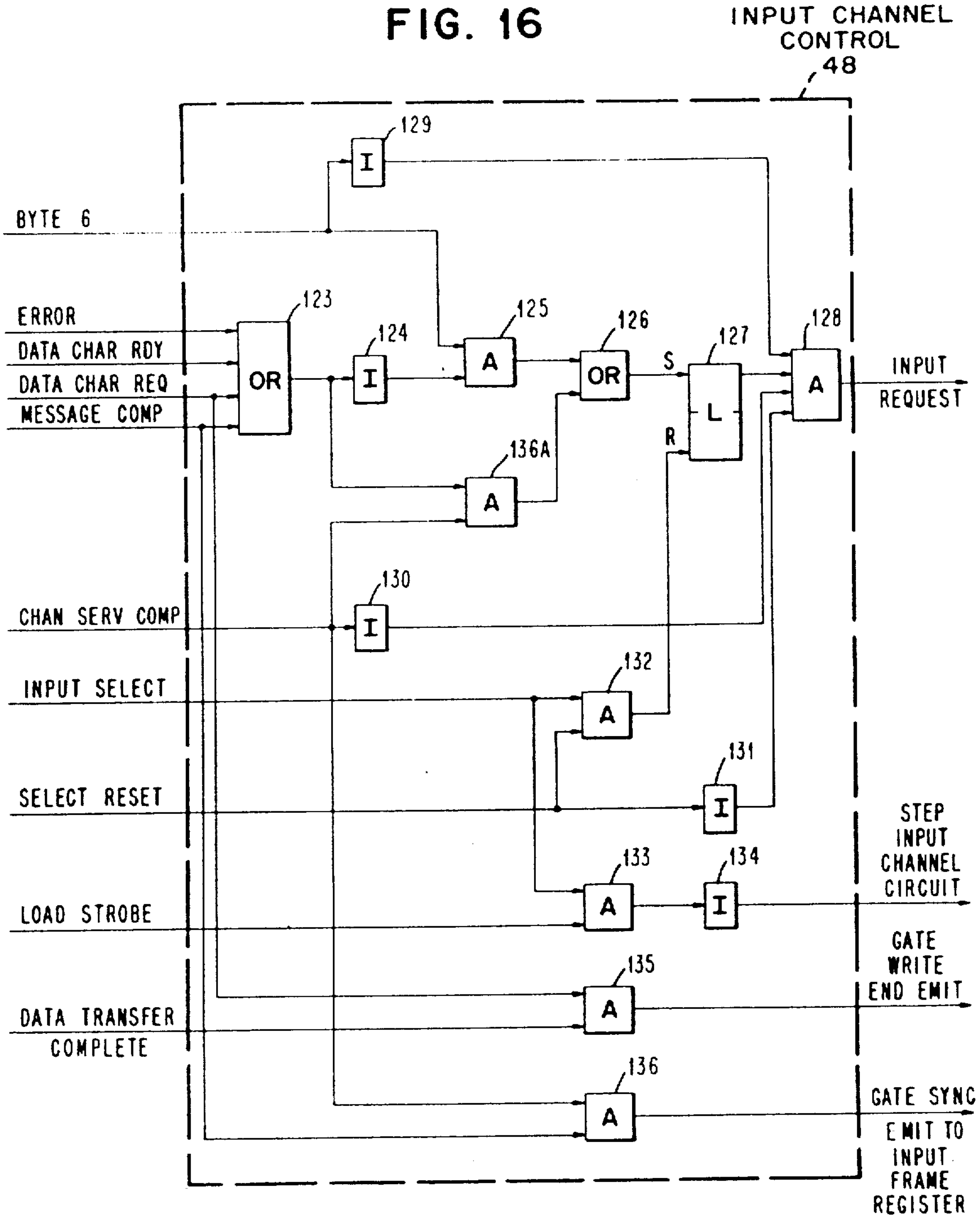

FIG. 16 is a schematic block diagram of the input channel control circuit 48 shown in FIG. 4A. This figure has the same inputs and outputs shown in the FIG. 4A presentation. An error signal, a data character ready signal, a data character request signal and message complete signal are applied to an OR-circuit 123. The output of this OR circuit is inverted by an inverter 124 and applied to an AND-circuit 125. The other input of AND-circuit 125 is connected to the byte number 6 output from input byte counter 23A. Thus when none of the conditions set forth above exist at byte 6 AND-gate 125 via an OR-circuit 126 sets a latch 127. The set output of latch 127 is connected to one input of a four-input AND-gate 128. The byte number 6 output from input byte counter number 23A is inverted in a circuit 129 and applied to one of the four inputs of AND-circuit 128. The channel service complete line from the CPU channel interface controls is inverted by an inverter 130 and applied to another input of AND-gate 128. This signifies that channel service complete is not present. The other input of AND-circuit 128 is select-reset inverted by an inverter circuit 131 which indicates that select reset is not present. Under these conditions, an input request is generated via the output of AND-circuit 128 at the trailing edge of byte number 6 since one of the inputs to the AND-circuit 128 is byte number 6 via an inverter 129. Thus, only on the trailing edge of this signal will the input request be generated. This assures that byte number 6 has been completed before the input request is generated. The input request is reset when input select and select-reset are provided by the section select and storage control circuit 29. When both of these are present, an AND-circuit 132 connected to both lines resets latch 127 to terminate the input request signal. Latch 127 may also be set via OR-gate 126 by the output of an AND-circuit 136A which responds to the output of OR-circuit 123 and channel service complete from the channel interface controls circuit.

The input select signal and the load strobe signal from section select and storage control circuit 29 are applied to an AND-gate 133 which is connected to an inverter 134 to generate the step signal for the input channel counter 24A. The inverter is utilized to assure that the step signal is generated at the trailing edge of the load strobe signal from circuit 29. A data transfer complete signal from the CPU channel interface controls and data character request from frame process control circuit 20 are applied to an AND-gate 135 which provides the gate write end emit signal applied to gate 67 connected between write end encoder 66 and the control byte section of the input frame register 47. This is a special technique for terminating the end of a writing operation under CPU control since the CPU provides the data transfer complete signal indicating that it has no more data for the terminal being serviced by the channel in process.

Channel service complete from the CPU channel interface controls and message complete from the frame process control circuit 50 are connected to an AND-gate 136 which provides an output for gating the sync emit circuit 131 to all sections of the input frame register 47. This is done when a terminal has completed communicating with the processor. The gating circuits for performing this function were not illustrated in FIG. 4 since this is just a means of clearing the input frame register once communication has been completed and does not constitute part of the invention.

Figure 17:
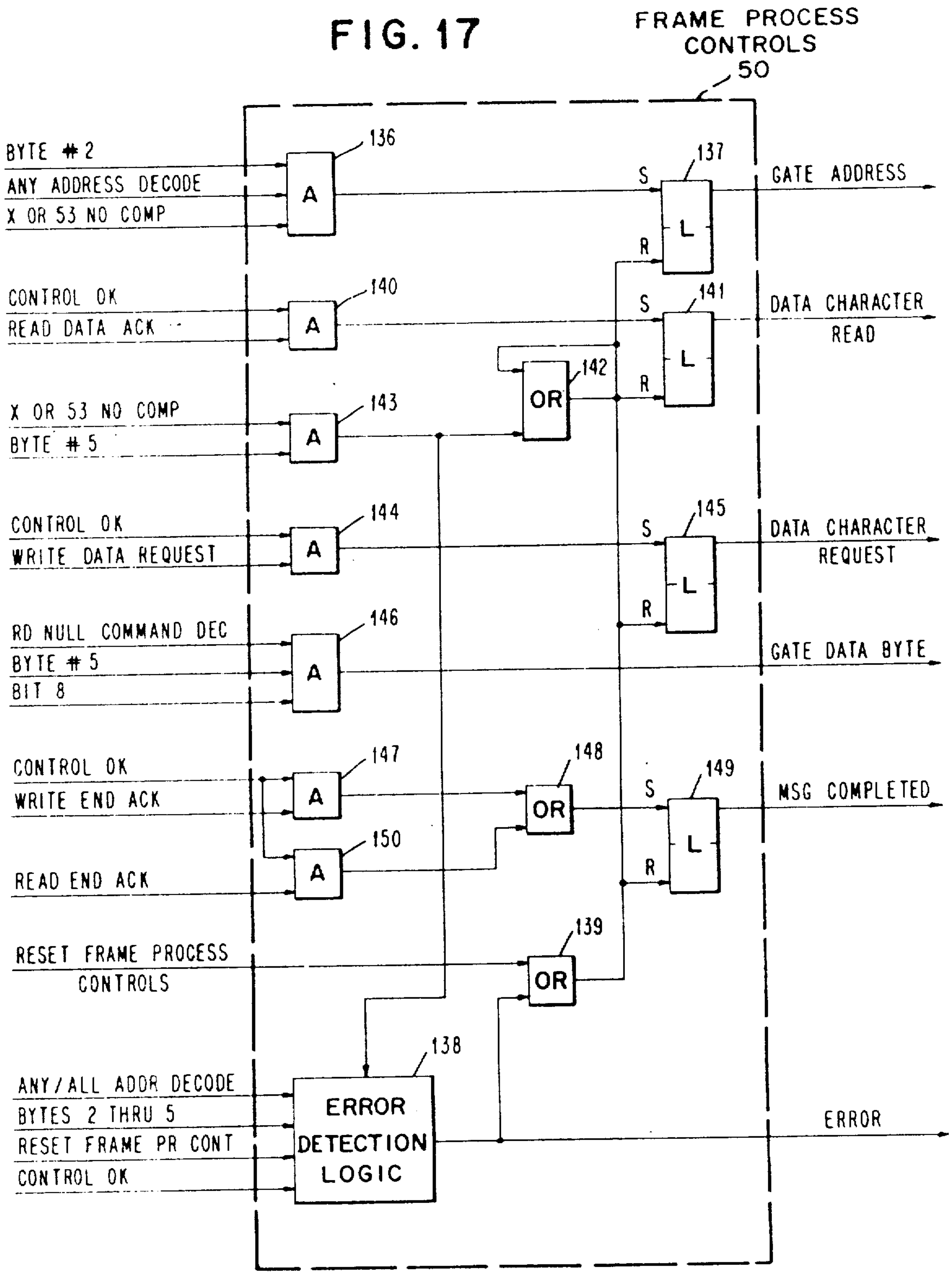

FIG. 17 is a detailed block diagram of the frame process control circuit 50 and includes all of the inputs and outputs previously described in FIG. 4 for this circuit. Byte number 2, "any address" decoder 49 output and exclusive OR 53 "no compare" output are applied to an AND-circuit 136. The output of AND-circuit 136 is connected to the set input of a latch 137 which provides the gate address output from the frame process control circuit 50 when the previously set forth conditions are met. Latch 137 is reset upon the occurrence of an error condition from the error detection logic circuit 138 or a reset frame process control signal. The error signal and the reset frame process control signal are applied via an OR-gate 139 to the reset input of latch 137. The details of error detection logic circuit 138 will not be described since these will be pure logic functions determined from the inputs illustrated. Other types of errors may be provided and can also be used for resetting latch 137 to terminate operation in the event of an error.

Control okay and read data acknowledge are applied to an AND-gate 140. The output of AND-gate 140 is connected to the set input of latch 141 which provides the data character ready signal. This latch is reset by the output of OR-circuit 139 which is connected to the reset input of the latch via an OR-circuit 142. The exclusive OR no compare output and byte number 5 are connected to AND-circuit 143 which has its output connected to the reset input of latch 141 via OR-circuit 142 for resetting latch 141 in the event that the exclusive OR no compare output is active during byte 5 to prevent the data character ready signal from being generated. This special error condition has been detailed separately since it is essential to the operation of the circuit described.

Control okay and write data request are applied to an AND-circuit 144. The output of this AND circuit is connected to the set input of a latch 145 which provides the data character request output for the frame process control circuit 50. Latch 145 is reset by the output generated by OR-circuit 139 previously described. Read null command decode output, byte number 5 and bit 8 are connected to a three-input AND-gate 146, the output of which generates the gate data byte signal previously described. Control okay and write end acknowledge are applied to an AND-circuit 147 which has its output applied via an OR-circuit 148 to the set input of a latch 149, the output of which indicates that the message is complete when the latch 149 is set. This latch may also be set by control okay and read end acknowledge applied to an AND-circuit 150 which has its output connected via gate 148 to the set input of latch 149. Latch 149 is reset by the output of OR-circuit 139 in the same manner as latches 137, 141 and 145.

Figure 18:
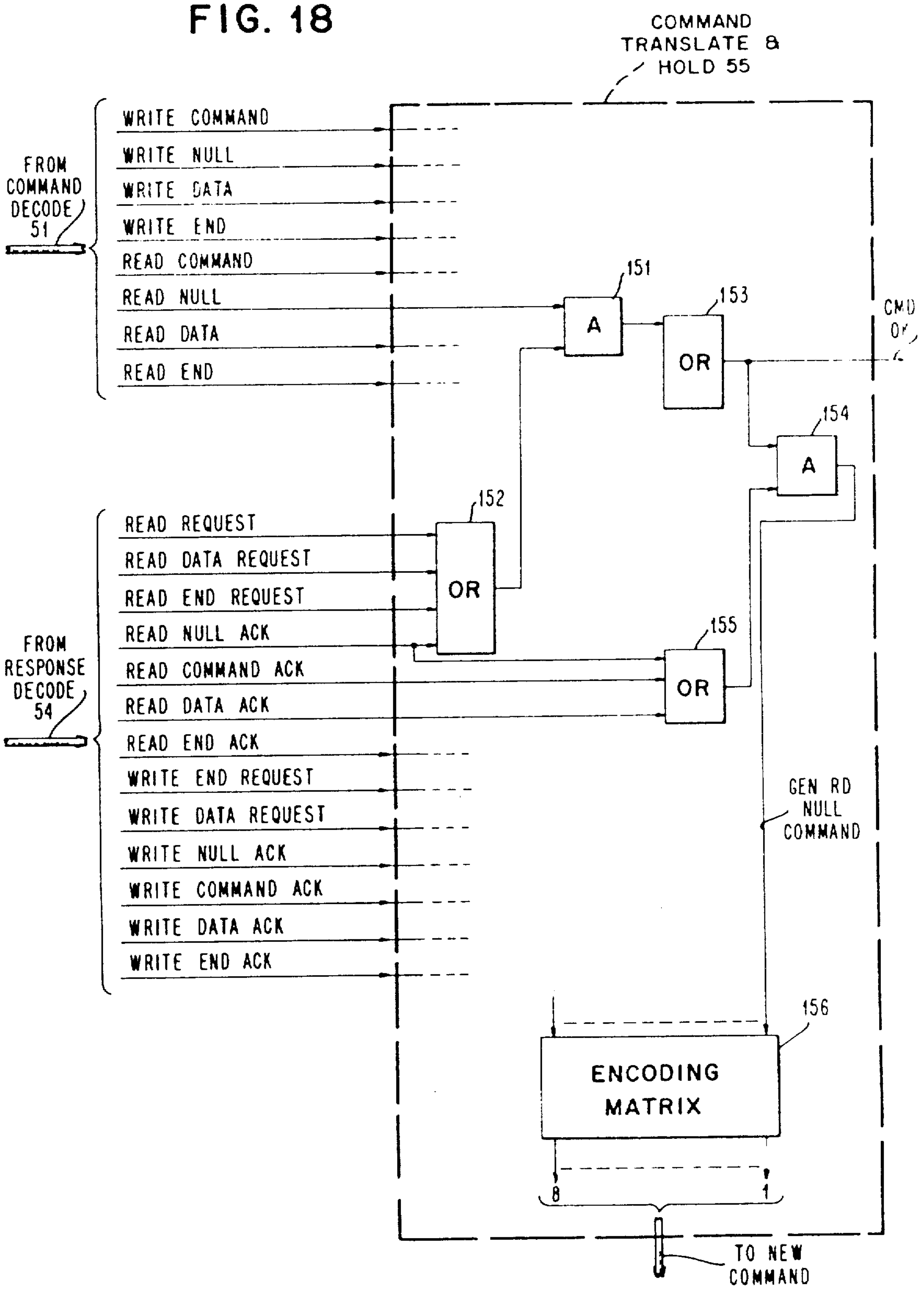

FIG. 18 is a detailed block diagram of the command translate and hold circuit 55 shown in FIG. 4. The outputs from command decode circuit 51 and from the response decode circuit 54 are listed in this figure. Only one of the command generations will be described and the rest will be detailed in tabular form in FIG. 19. From the description of the one in FIG. 18, the circuits necessary for generating the remaining commands will be obvious from the table shown in FIG. 19. The read null command decode from circuit 151 is applied to one input of a two-input AND-gate 151. The other input of AND-gate 151 is from an OR-circuit 152 which receives read request, read data request, read end request and read null acknowledge from the response decoder circuit 54. Thus, if any of the responses listed as being connected to OR-circuit 152 are present while the read null command has been previously sent, AND-circuit 151 generates an output via an OR-circuit 153 which indicates that the command response was proper for the command sent.

The output of OR-circuit 153 is connected in addition to an AND-circuit 154. The other input of AND-circuit 154 is derived from an OR-circuit 155 which is connected to read null acknowledge, read command acknowledge and read data acknowledge from response decoder 54. Thus, if the command is okay and any of the three commands specified, read null acknowledge, read command acknowledge or read data acknowledge are present, a signal is developed at AND-circuit 154 which is applied to an encoding matrix 156 which generates a read null command which is the new command which must be generated by this circuit under these conditions.

Figure 20:
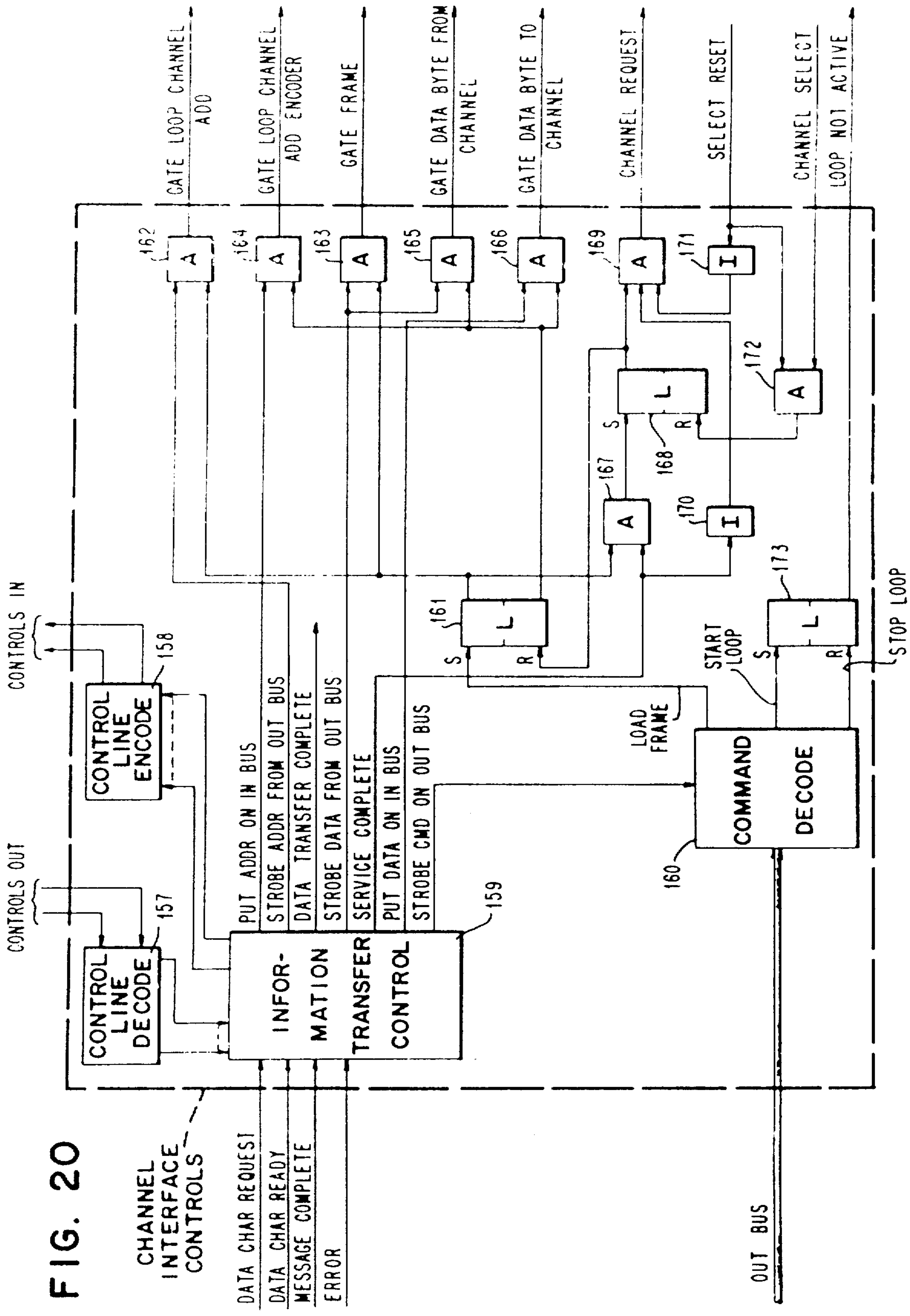

FIG. 20 is a detailed block diagram of the CPU channel interface controls and is in compliance with the IBM channel interface for Systems 360 computers. This interface may be changed to correspond to any other computer which may be utilized with the communication system described and the interface will of necessity be dictated by the computer utilized with the communications network.

The control lines from the computer are applied to a control line decoder 157 and a control encoder circuit 158 is connected to the control line into the computer. The control line decoder 157 and the control line encoder 158 are connected to a Systems 360 information transfer control section constructed in compliance with the Systems 360 architecture. The signals supplied by the communications system are as previously described, data character request, data character ready, message complete and error. The information transfer controls supplies from the computer, the following standard commands: data transfer complete, strobe address from out bus, put address on in bus, strobe data from out bus, put data on in bus, service complete and strobe command on out bus. These commands are with the exception of data transfer complete, altered to suit the disclosed communications system by the remaining elements shown in detail as being part of the interface controls.

The computer out bus is connected to a command decoder which is designed to decode the commands utilized. That is, load frame, start loop and stop loop. These are decoded upon strobe command on the output bus from the CPU. Load frame command when decoded is applied to the set input of a latch 161. The set output of latch 161 enables an AND-gate 162 and another AND-gate 163. AND-gate 162 has its other input connected to strobe address from out bus and provides the gate loop channel address signal which operates gate 63 to insert the loop channel address supplied by the computer on the channel out bus to the loop channel address register 64. Gate 163 is connected to the strobe data from out bus line and provides the gate frame signal which is applied to gate 60 for gating the frame on the channel out bus to the channel frame register 61. The reset output of latch 161 is connected to AND-gates 164, 165, 166 and enables these AND gates when latch 161 is in the reset condition. AND-gate 164 has its other input connected to the put address on in bus line and provides the gate loop channel address encoder signal which gates the loop channel encoder circuit 59 and provides the loop channel address to the in bus of the computer. AND-gate 165 has its other input connected to the strobe data from output bus line and provides the gate data byte from channel signal which operates gate 58 and gates the byte on the channel output bus into the data section of the input frame register 47. AND-gate 166 has its other input connected to the put data on in bus line and provides the gate data byte to channel signal which operates gate 52 and inserts the data byte in the input frame register 47 into the channel in bus upon the generation of this command.

The set output of latch 161 is also applied to one input of an AND-circuit 167 which has its other input connected to the service complete line. When latch 161 is set and service complete comes up, AND-circuit 167 generates an output which sets a latch 168. The set output of latch 168 is applied to the reset input of latch 161 and resets latch 161. In addition this output is connected to an AND-gate 169. The service complete line is applied via an inverter 170 to AND-circuit 169. The select reset output previously described from section selection and storage control circuit 29 is inverted by an inverter 171 which has its output connected to AND-gate 169. Thus, if both service complete and select reset are not present and latch 168 is set, the channel request line comes up. This indicates that the channel requires service and a load frame operation is required. This is indicated by latch 161 being set and the completion of the service. Service complete is inverted in circuit 170 and causes the channel request operation to come up at the trailing edge of the service complete signal so that channel request will not be requested prematurely. Select reset and channel select are applied to an AND-circuit 172 which has its output connected to the reset input of latch 168 to effect the termination of channel request since select-reset and channel select indicate a successful channel request operation. A latch 173 connected to start loop and stop loop from command decoder 160 provides a loop not active signal when stop loop resets the latch.

FIG. 5 illustrates one of the remote terminal complexes in the loop illustrated in FIG. 1. The twisted pair transmission line forming the loop is connected to a pulse terminating circuit 175 which may be identical to pulse terminating circuit 40 described in FIG. 4. The output of the pulse terminating circuit 175 is applied to a clock and data derivation circuit 176 which may be similar to clock and data derivation circuit 41 described in FIG. 4. This circuit provides a shift clock signal, a data sample, a load clock signal and the data lines. These three signals are derived similar to that shown in that the description of circuit 41 but have three delays rather than the two delays described in that circuit. The data from derivation circuit 176 is applied to the input stage, an eight-bit shift register 177. The output stage of the shift register is connected via gate 178 to a pulse driver circuit 179 which is connected to the loop via the twisted pair and may be identical to pulse driver circuit 36 described in FIG. 4. The other terminal complexes on the loop are identical and are connected between the pulse driver circuit 36 shown in FIG. 4 through as many as 100 terminal complexes back to pulse terminating circuit 40 shown in FIG. 4.

The shift clock pulses from clock derivation circuit 176 are applied to the shift register 177 to control data flow in, and to the step input of a bit counter 180 which counts from 1 to 8. The bit 1 output of bit counter 180 is applied to the step input of a byte counter 181 which counts from 1 to 5. The synchronizing of counters 180 and 181 in the terminal complexes differ from those in the central station illustrated in FIG. 4. A count of the number of synchronizing bytes is not essential to maintenance of synchronization and only the byte counter is utilized since the terminal complex is interested only in the first five bytes of each channel as it passes and is unconcerned by the number of synchronizing bytes between channels. It is essential in the operation of the terminal complexes that byte synchronism be maintained since the shift register contents must be examined in parallel when a byte as assembled in the central station and transmitted resides within the shift register. This is accomplished by the circuitry which will be described below.

An output bus is taken from the shift register 177 and provides the eight bits in parallel to sync/start decode circuit 182. This circuit continuously monitors the contents of the shift register and provides one of three outputs depending upon the contents in the register. If it decodes a sync code in the register, it provides a sync output. If it decodes a start code in the shift register, it provides a start output and if neither is present, this is indicated. These three outputs are applied to a byte/frame sync control circuit 183 which will be described in detail later. In addition to the above inputs, circuit 183 receives a data sample, reset from byte counter 181, and bit 8 from the bit counter 180. From these six inputs, the circuit determines whether a frame is present and whether the device is in byte synchronism at any given data sample time. If a frame is not present at any bit time, the frame not present line from circuit 183 resets the byte counter 181. If the device is not in byte synchronism, the not in byte synchronism line resets the bit counter. This permits a continuous searching for byte and frame synchronism. Once a frame is present and byte synchronism is achieved, both outputs go down until the appropriate time. If byte synchronism is maintained, the bit count 180 is continuously stepped by the clock pulses of clock derivation circuits 176 and recirculates at the clock rate maintaining byte synchronism throughout. However, if for some reason a bit is lost in the train of bits and the unit goes out of byte synchronism the not in byte sync line will come up and the procedure for achieving byte synchronism will be instituted. This procedure will become more clear when a detailed description of circuit 183 is given later.

The output bus of shift register 170 is also connected to an address decoder 183 which provides one of three outputs, "this address," "any address," and "all addresses." The "this address" output indicates that the address contained in the second byte of the frame of the channel in process contains the unique address of this terminal complex. This indicates that the data and the control information in this frame is directed to one of the terminals connected in this terminal complex. The "any address" output indicates that this is a polling frame and that any terminal complex which requires service may seize this particular frame in this channel by substituting its own unique address for the "any address" code contained in byte 2 of the current frame for this channel. The "all address" output indicates that the data and control information contained in the frame of the channel is to be utilized by one or more terminals at each of the complexes connected in the loop. The information contained in the current frame containing an "all address" in byte 2 may not be altered by any of the terminals. How these outputs are utilized will become apparent as the description continues. Address decoder 183 has three additional inputs which control the timing of the decoding.

Data sample from circuit 176, bit 8 and byte 2 are applied to the address decoder, thus, address decoding can only occur at data sample during bit 8 of byte 2. This assures that address information is in the shift register at the time the decoding takes place. At all other times, no decoding will take place. The three outputs from address decoder 183 are applied to a terminal selection control circuit 184 which also receives an input from the terminal connected to the complex which requires service. Only one of the terminals connected to the complex may request service at any given time. Other terminals will be locked out by conventional circuitry. The connection of the terminals has not been shown since this is not considered part of this invention and conventional control lines for the terminal only have been shown with appropriate addressing for specific terminals on the line. These will be described in greater detail later.

Terminal selection and control circuit 184 from the four inputs described above provide two outputs. The first indicates that this terminal only has been selected. This is applied to a gate circuit 185 which controls loading of data into the shift register from the in bus illustrated. This provides a load strobe which inserts or changes the data in the register to that contained on the in bus. Gate 185 has two additional inputs which must be satisfied before the load strobe is applied to the shift register for putting data on the in bus into the shift register in place of the data contained thereon. These are load clock from circuit 176 and bit 8 from the bit counter 180. Thus data can only be loaded into the shift register at the appropriate load time in the clock cycle and at bit 8 of any of the bytes in the shift register when the particular terminal complex has been selected.

The terminal selected output from circuit 184 is applied to a data transfer control circuit 186, to a command decode circuit 187 and to a device address decoder 188. The reset from byte counter 181 which is transferred after byte 5 is applied to terminal selection control circuit 184 for resetting this circuit at the termination of any frame passing through the shift register 177 so that it is prepared to operate on the next frame associated with the next sequential channel.

An address encoding circuit 189 is connected directly to the in bus and is gated at byte 2 from the byte 2 output of byte counter 181. This inserts the terminal complex address in the shift register upon the occurrence of the load strobe from gate 185. This technique allows a polling frame to be captured and is also utilized for error checking since normally gate 185 will only be enabled when the this terminal only line from terminal selection control 184 is energized. This technique of error checking is employed for detecting terminal complexes which are misusing frames by altering addresses of other terminal complexes.

Device address encoder 188 receives the terminal selected signal from circuit 184, bit 8 from bit counter 180, byte 3 from byte counter 181 and data sample from clock derivation circuit 176. Thus, at byte 3 when the terminal has been selected, the address in shift register 177 is decoded by decoding circuit 188 which energizes one of $n$ lines depending upon the code decoded. These $n$ lines are used for selecting one of $n$ terminals located at the complex defined by the contents of the third byte of the frame in process.

Command decode circuit 187 receives the terminal selected output from circuit 184, bit 8 from bit counter 180 and byte 4 from byte counter 181 and decodes the command located in the fourth byte in the frame in process. The decoded command is applied to the data transfer control circuit 186. Data transfer control circuit 186 receives in addition from the circuits previously described the load clock signal from circuit 176, bit 8, byte 5 and data sample. The circuit performs a number of functions. One of the primary functions being translation of the command received into a response command. This is accomplished by the various inputs supplied from the connected terminal. How this is done will be described later in connection with a detailed circuit description of the data transfer controls 186. The control translate output provided is applied to a command response encoder circuit 190 which generates the appropriate command response at byte 4 time and applies it to the in bus where it is strobed at the appropriate time into the shift register 177 to replace the receive command from the central station. These commands were previously described above in connection with the description of the response decoder 54 and the command translate and hold circuit 55.

Circuit 186 receives a ready for data byte signal in the case of a terminal which is performing a writing operation and provides a data strobe and a write operation in process signal to permit the connected terminal to perform the writing operation. For terminals which are performing a reading function, it receives a service needed signal, a data ready signal and a transfer complete signal from the terminal and provides a read operation in process signal and a data received signal when data has been received. It also provides a data gate signal to a gate circuit 191 connected in the in bus between the connected terminal and the shift register 177. This gate is operated under control of data transfer controls and byte 5 is utilized for inserting the data byte from the connected terminal in the fifth byte position of the frame in process.

When a terminal is selected, it supplies a unique line to a device address encoder 192 which provides a unique code identifying the terminal device. The output of encoder 192 is applied to a gate circuit 193 which is under control of byte number 3 from the byte counter 181. This inserts the unique terminal address in the byte 3 position of the frame in process to identify to the central the terminal at the terminal complex which is in the process of communicating in that particular frame of that channel. In some instances, this will overlay the same address which is already contained in this byte. In the case of an "any address" frame wherein a polling operation is required, the address inserted will replace the data contained in the third byte position in the same manner that address encode circuit 189 replaces the "any address" data in the second byte position of the frame in process.

The connection of the terminals to the terminal interface of the terminal complex control shown in FIG. 5 may take any number of forms. If a single terminal only is utilized at the complex, the circuits 188, 192 and 193 are not required. This renders byte number 3 surplus and it will not be utilized by this complex. It may be eliminated from the system by redesigning the byte counters shown in FIGS. 4 and 5 to include one less byte if all complexes have only one terminal. Where a plurality of terminals are connected to the terminal interface, the only requirement which must be observed is that once a terminal has seized the interface by providing a service needed signal on the service needed line, the other terminals connected to the interface cannot make an attempt to seize the interface until the terminal which has seized the interface has completed its operation and has released the interface. The details of this connection have not been illustrated since they form no part of the present invention and a variety of connections to this interface may be utilized depending upon the numbers and types of terminals one desires to connect to the terminal interface of the terminal complex controls.

Figure 21:
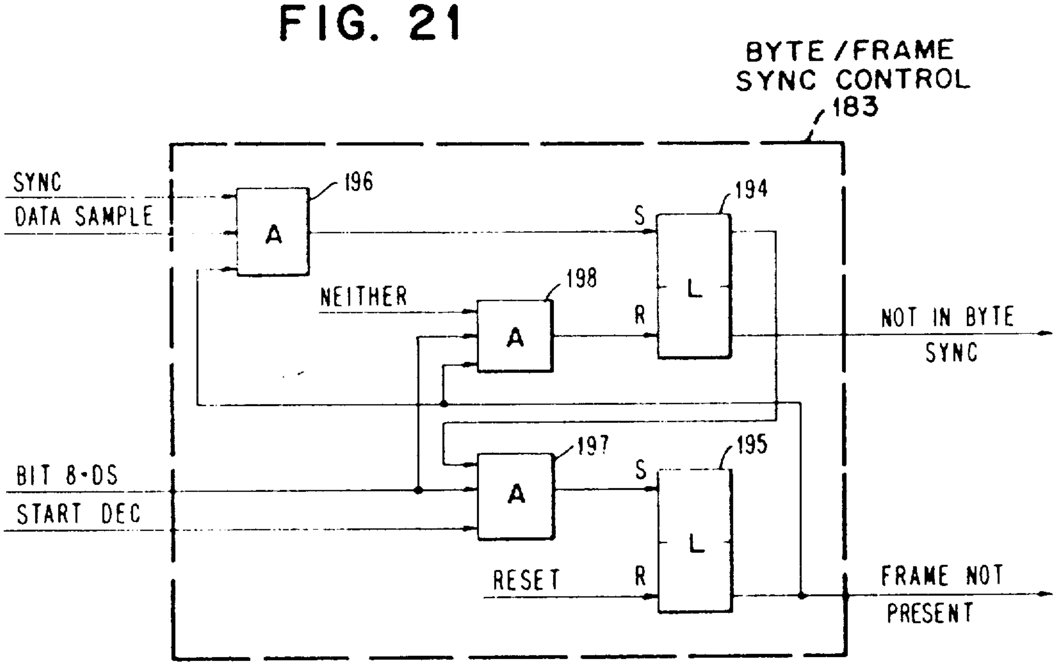

FIG. 21 is a block diagram of the byte/frame sync control circuit 183. The circuit includes two latches, 194 and 195. Latch 194 will be normally reset when the device is not in byte synchronism and latch 195 will be normally reset when a channel frame is not present. The reset output of latch 195 is connected to an AND-gate 196 which also receives the sync output from sync/start decode circuit 182 and data sample from clock derivation circuit 176. If latch 195 is reset, thus indicating that a frame is not present, sync is received at data sample and latch 194 is set thus removing the not in byte sync output from the circuit when latch 194 is set. Another AND-gate 197 is enabled by the set output of latch 194 and as soon as start, bit 8 and data sample are received latch 195 becomes set thus indicating that the frame is present. Latch 195 is reset by the reset output from byte counter 181. Latch 194 is reset at bit 8 and data sample, latch 195 being reset and neither sync nor start being received by circuit 182. These are applied to an AND-circuit 198 which has its output connected to the reset input of latch 194. This circuit provides the two signals which indicate the presence of the frame and byte synchronism.

Figure 22:
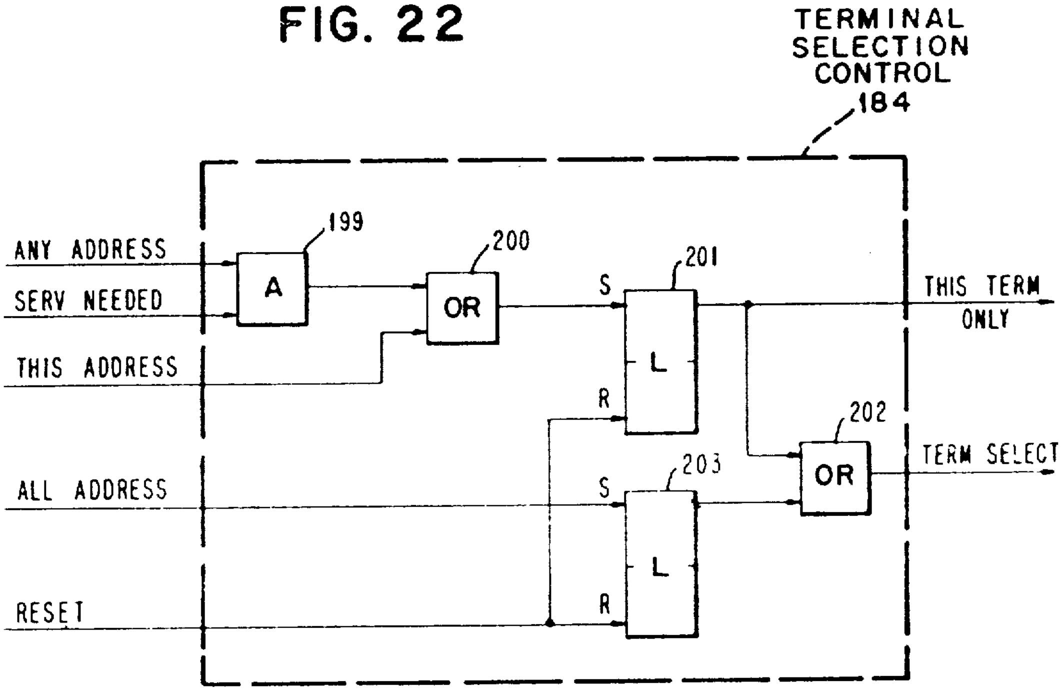

FIG. 22 is a detailed block diagram of the terminal selection control circuit 184. The "any address" line from address decoder 183 and the service needed line from the remote terminal are applied to an AND-circuit 199. The output of this circuit is applied via an OR-gate 200 to the set input of a latch 201 which when set provides the this terminal only output. The set output of latch 201 is connected to an OR-circuit 202, the output of which provides the terminal select signal previously described. In addition, latch 201 may be set by the this address line from the address decoder 183 which is applied to the set input of latch 201 by OR-circuit 200. The all address from decoder 183 is connected to the set input of a latch 203 which has its set output connected via OR-circuit 202 to provide the terminal select signal. Reset from the byte counter 181 is connected to the reset inputs of latches 201 and 203 and resets both at the termination of any given frame in the successive channels.

Figure 23:
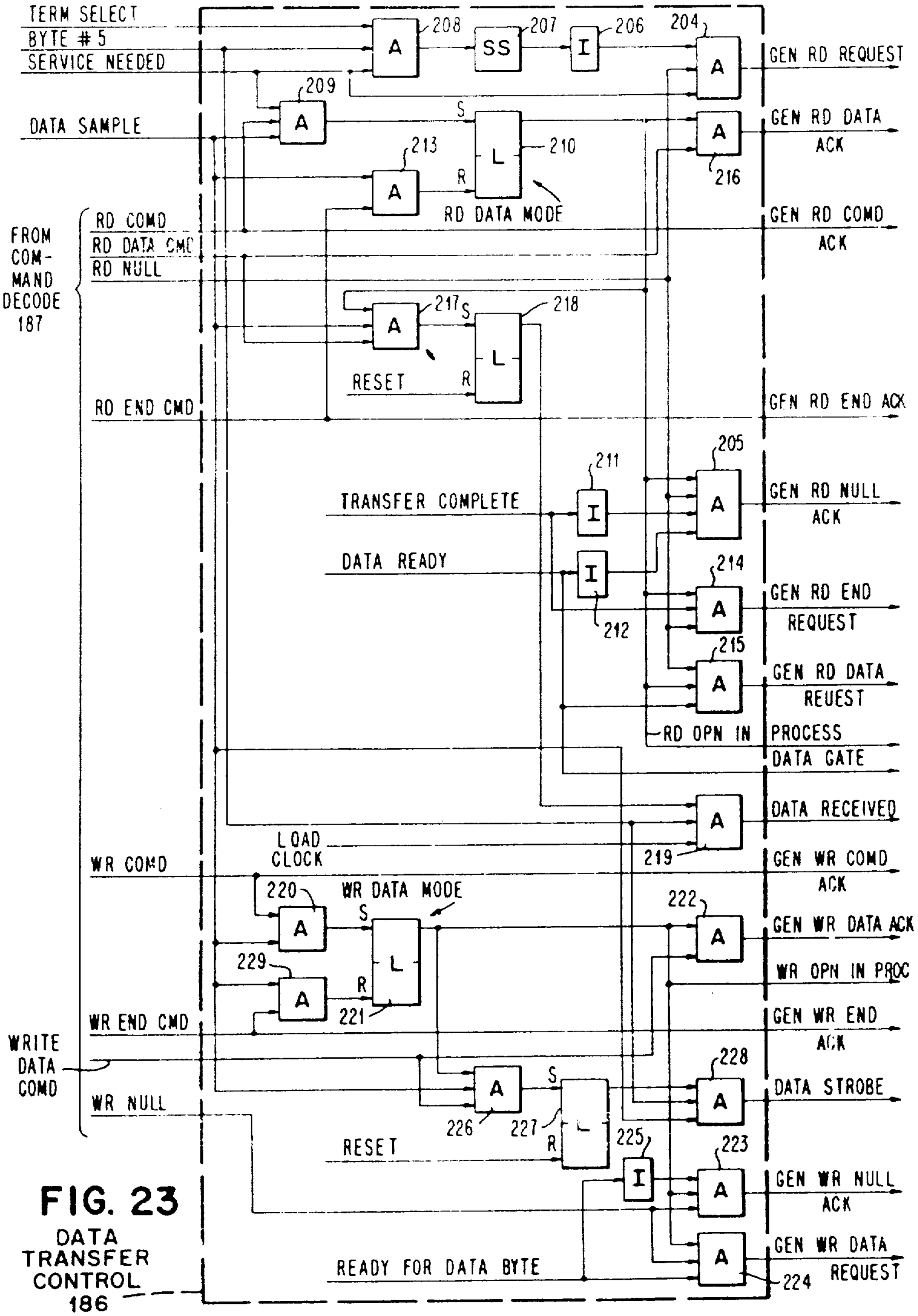

FIG. 23 is a detailed block diagram of the data transfer control circuit 186 illustrated in FIG. 5. This circuit provides the responses that must be made for given commands received as well as data gate, data received, read operation and process, right operation and process, and data strobe.

The commands received by the terminal complex have been set forth in the table of FIG. 19 and the appropriate responses thereto are set forth in the second column of that figure. FIG. 23 illustrates how these responses are generated. A reading operation is always preceded with a read null from the central. This is decoded in the command decoder 187 and applied to data transfer control circuit 186. The read null signal is connected to a pair of AND-gates 204 and 205.

AND-gate 204 when properly energized provides a signal which is utilized for generating read requests in the command response encoder circuit 190. This AND gate has two additional inputs. One is connected to the service needed line from the terminal interface, the other is connected via an inverter 206 and a single shot circuit 207, to an AND-gate 208. AND-gate 208 receives terminal select, byte 5 and service needed. The purpose of this input is to prevent multiple selection of "any address" frames since the single shot circuit 207 disables AND-gate 204 via inverter 206, following a first selection of an "any address" frame. This single shot disables the gate for a period equal to at least two times the time between successive frames in the same channel.

AND-gate 205 has three additional inputs, and generates the read null acknowledge command response in encoder 190. This command cannot be generated on a first read null which accompanies an "any address" frame and must follow a subsequent read null command signal coming from the central station. The read command output of the command decoder is applied to an AND-circuit 209 which also receives service needed and data sample. When the three conditions are satisfied the output of AND-circuit 209 sets a latch 210. The set output of this latch indicates that a read data-type service is being conducted.

The output of latch 210 comprises one of the inputs of AND-circuit 205. The other two inputs of AND-circuit 205 are transfer complete inverted in a circuit 211 for indicating that the transfer is not complete and data ready inverted in a circuit 212 for indicating that data is not ready. Thus, once the channel has been captured and a read command returned, a subsequent read null signal from the central station will result in a read null acknowledge if neither type of request is present at that time. The transfer complete and data ready signals are standard signals received from the terminals connected to the terminal interface and indicate the condition of the terminal to the complex controller shown in FIG. 5.

Latch 210 is reset by data sample and the read end command applied to the reset input of latch 210 via an AND-circuit 213. This connection prevents the resetting of the latch 210 until such time as the read sequence has been completed by the transmission and receipt of the read end command, otherwise latch 210 will remain set throughout an entire read operation.

The read command signal received from the command decode circuit 187 is sent directly through to the command response encoder 190 and generates the read command acknowledge. The other valid responses for a read null are read end request and read data request. The set output of latch 210 is connected to an AND-gate 214 which generates the read end request and to an AND-gate 215 which generates the read data request. AND-gate 214 is connected in addition to read null and to transfer complete. Thus, providing upon satisfaction these conditions, data mode, read null, and transfer complete, a signal for generating read end request in the response decode circuit 190. AND-gate 215 is connected in addition to data ready and to read null and supplies a signal for generating the read data request in the response encoder 190.

The read data command received from the command decoder circuit 187 is applied to an AND-gate 216 which has its other input connected to the set output of latch 210 and provides the signal for generating read data acknowledge in the response decoder 190. Read data command, data sample and the set output of latch 210 are applied via an AND-circuit 217 to the set input of a latch 218. The set output of latch 218 provides one input to an AND-circuit 119, the other two inputs of AND-circuit 119 are byte 5 and load clock, the output of this AND circuit provides the data received signal and latch 218 is reset by the reset output of byte counter 181.

Read end command received from the command decoder circuit 187 provides directly without alteration, the generation of read end acknowledge. The data gate signal is provided directly from data ready from the terminal connected to the terminal interface and read operation in process is derived from the set output of latch 210.

The remaining portion of the circuit shown in FIG. 23 is concerned with a write operation and the sequence of right commands which are received from the central controller. When the write command is received from the command decode circuit 187 it directly generates the write command acknowledge by supplying a signal to the command response decoder 190. In addition, the write command is applied to one input of an AND-gate 220. The other input of AND-gate 220 is connected to data sample, thus with write command and data sample latch 221 is set. This latch is substantially similar to latch 210 and performs substantially the same function, however, with respect to a write operation. The set output of latch 221, writing is applied to AND-gates 222, 223 and 224.

Following receipt of a write command acknowledge in accordance with the table in FIG. 19 as previously described, the central station provides the write null in the next frame of this channel. When the write null command is decoded and received, it is applied directly to AND-gates 223 and 224. AND-gate 223, in addition, receives the ready for data byte signal from the terminal via an inverter circuit 225. This indicates that the terminal is not yet ready for a data byte. Thus AND-gate 223 in this instance, if the terminal is not ready for a data byte, will generate a write null acknowledge signal. This is applied as previously described to command response encoder 190 which actually generates the signal. AND-gate 224 is connected to the ready for data byte signal, thus if the terminal is ready for a data byte, the output of AND-gate 224 when applied to response encoder 190 generates the write data request response. When the write null acknowledge signal is generated by the output of gate 223, the central responds with another write null. This will continue until the terminal is ready for the data byte at which time the write data request will be generated by the output of AND-gate 224 described. When the write data request is sent back, the next command to be received will be the write data command. This command will be accompanied by the data byte in the fifth position of the frame. The write data command is applied directly to AND-gate 222 and generates the write data acknowledge in the command response encoder 190 since gate 222 is enabled by the set output of latch 221.

The write data command also generates the data strobe at byte number 5 time. The write data command is applied to an AND-circuit 226 along with the set output of latch 221 and data sample. The output thus generated sets a latch 227 which enables an AND-gate 228. AND-gate 228 provides the data strobe signal at byte 5 and data sample when latch 227 is set. Latch 227 is reset at the end of byte 5 by the reset signal from byte counter 181 to thus prevent another data strobe until the next write data command is received.

The set output of latch 221 also provides the write operation in process signal utilized by the terminal connected to the terminal interface. After the writing operation has been completed under control of the computer, the write end command is supplied. This directly generates the write end acknowledge in circuit 190. In addition, it is applied via an AND-gate 229 to the reset input of latch 221 during data sample which is connected to the other input of AND-gate 229. This resets latch 221 thus terminating the writing operation.

OPERATION

Figure 6:
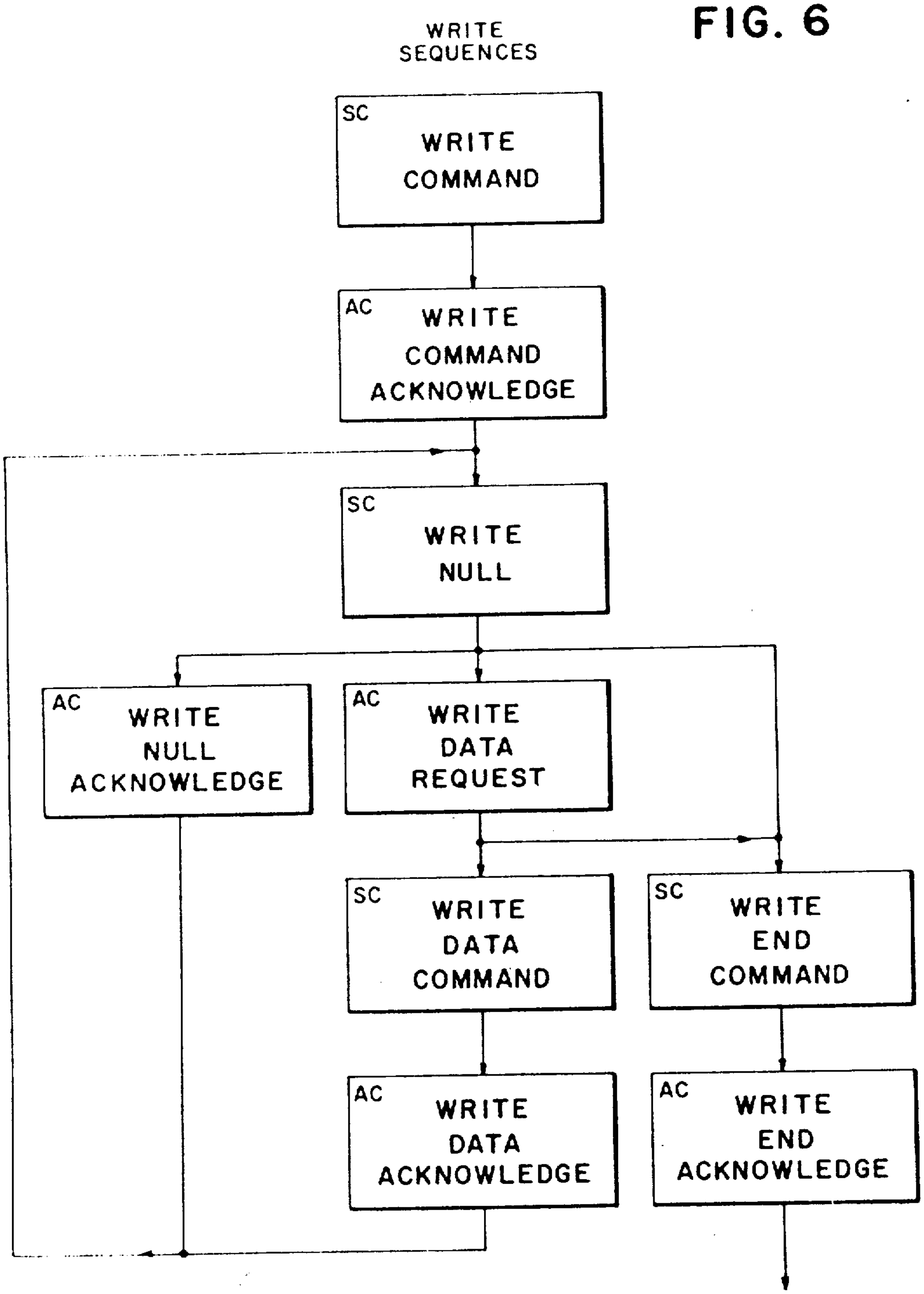

FIG. 6 is a flow chart of a typical write sequence. The sequence is always instituted by the computer and the computer accomplishes this sequence by loading a frame in a given channel addressed to a specific terminal complex and output terminal. The first frame inserted in the selected channel includes a write command. At the appropriate time, the output section transmits this write command addressed to the specific terminal on the line. When the specific terminal complex receives its own address followed by the write command, it modifies the command to a write command acknowledge and generates the write operation in process which is sent to the specific terminal as defined by the decoded terminal address or to the only terminal if only one terminal is connected. This indicates to the terminal that it is to perform an output operation.

When the central controller receives the write commanded acknowledge, it provides a write null command in the next frame. This command is generated in the input section when the frame is received and then stored in the appropriate channel address as a new frame for that channel where it awaits transmission by the output section. When the terminal complex receives the write null command, it will generate a write null acknowledge if the terminal device is not ready for the data byte. It will continue to do this as it receives write null commands until the terminal device is ready.

When the terminal device is ready, it will respond to the next write null command from the central controller with a write data request as illustrated in the circuit shown in FIG. 23. When the system controller receives the write data request, it generates a write data command and interrupts the computer for loading the data byte. The write data command and the data byte are then inserted in the frame storage in the correct channel address. This frame is transmitted in due course by the output section. The terminal complex when it receives this command generates the write data acknowledge and the data strobe. The data strobe is sent to the terminal device which samples the data byte during byte 5 from the out bus of the shift register 177. This loop will continue in the same manner until all data bytes addressed to the specific terminal are received. If the central controller requests a data byte from the computer after the last data byte has been sent by the computer, it will notify the central controller that the writing operation has been completed and that there is no more data. At this time, the write end encoder circuit 66 will insert the write end command in the frame as previously described. This will be sent to frame storage and transmitted to the terminal complex. When the write end command is received, the write end acknowledge is returned to the central controller and the latch 221 is reset as previously described in the description of FIG. 23.

Figure 7:
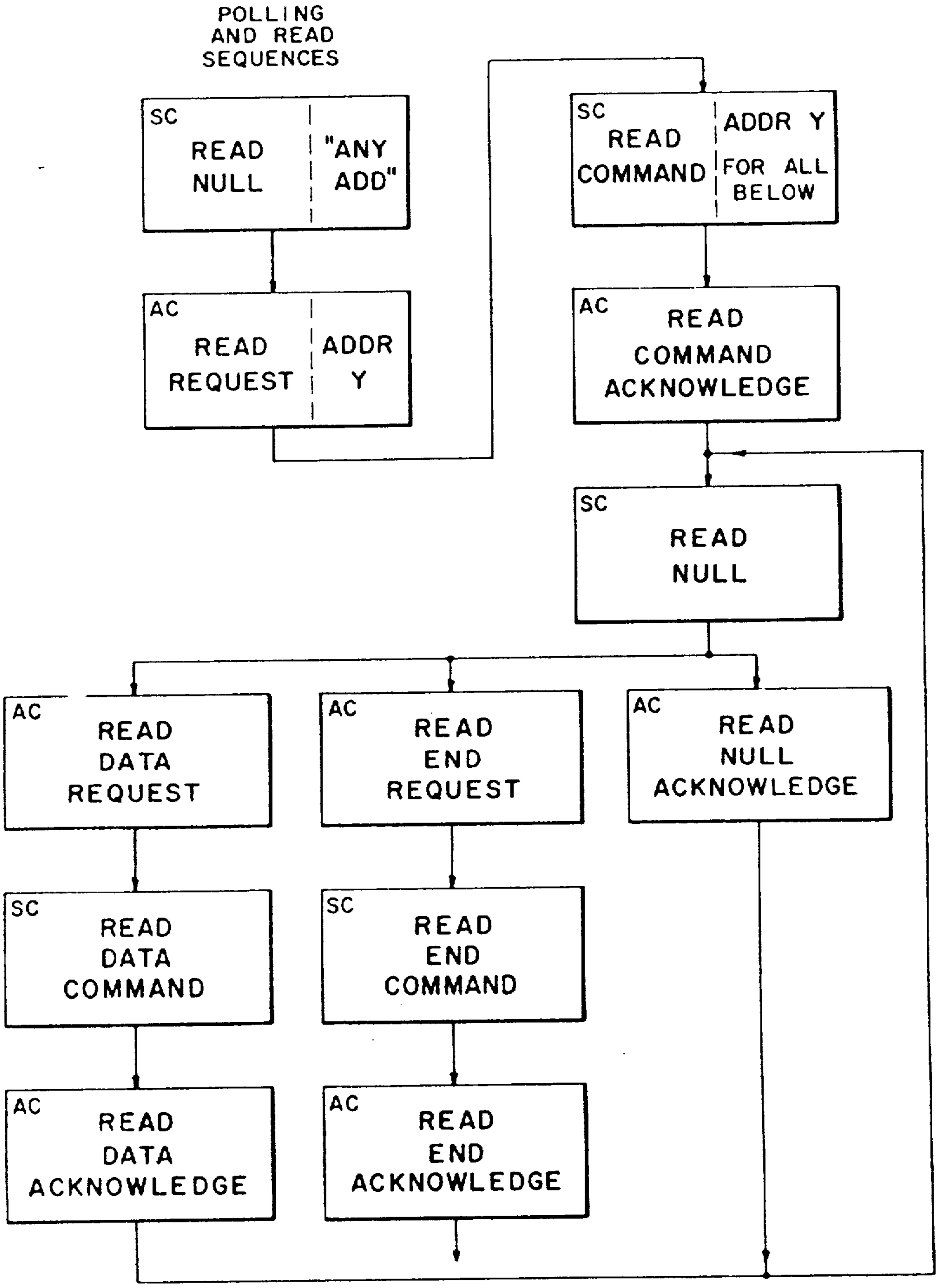

FIG. 7 is a flow chart of a typical polling operation followed by a reading operation. The computer controls the loading of the frames in any given channel in the frame storage 20 and will provide under program control polling channels. These will include the "any address" in the terminal address or byte 2 portion of the frame and a "read null" in the command portion of the frame byte 4. When a terminal complex has a terminal which requires service, it searches for the "any address" code in the second byte position of the frame of any given channel it receives. When it requires service, this is indicated by the service needed line from any of the connected terminals. As soon as it receives an "any address" code in byte 2 and has the service needed line up, it inserts its own unique address in the byte 2 position and alters the read null command code to the read request code. Circuits for performing this are shown in FIG. 23. The central controller receives the frame and is aware that the address has been altered from an "any address" to a specific address and that an appropriate command, namely the read request has been inserted. It retains the specific address received and alters the command byte to a read command and stores the frame in the frame storage 20 where the output section eventually transmits this frame.

The terminal complex receives the altered frame in the next subsequent cycle of that channel and generates the read command acknowledge, which is inserted in the fourth byte position of the frame. At this point, the terminal complex has captured the channel for the device requiring service. When the system controller receives the read command acknowledge response from the terminal complex, it modifies the command byte in the frame to the read null command as previously described. The modified frame is stored in the appropriate channel address in frame storage and the output section processes this frame in the manner it has processed the previous frames.

When the read null frame is received by the terminal complex latch 210, FIG. 23 has previously been set and signals the read operation in process to the terminal. The terminal if it is ready to send data will have brought up the data ready line. However, if the terminal is not ready, the data ready line will not be up and the terminal complex will generate the read null acknowledge. This is the idle sequence, read null, read null acknowledge.

As soon as the terminal is ready to send the data, the data ready line will come up and the terminal complex will respond to the next read null with the read data request response. This will be altered to the read data command at the central and transmitted again. Read data command will be responded to by the read data acknowledge and the byte of data from the erminal will be inserted in the byte 5 position of the frame of he channel in process. At this point, the data receive signal vill be generated by AND-gate 219, FIG. 23 as previously lescribed so that the terminal can prepare to transmit the next yte of data. When the system controller receives the read lata acknowledge, the byte of data in byte 5 is transmitted to he computer as previously described and the command code s altered to read null. On the next subsequent cycle of this hannel, if the terminal is not ready with the next data byte the ead null acknowledge response previously described is enerated and an idle sequence takes place. As soon as the ext data byte is ready the data ready signal comes up and the ead data request response is generated and the cycle previously described is repeated.

When the transfer is complete, the terminal signals the data ransfer controls 186 that the transfer is complete and the data ransfer controls 186 causes the generation of read end equest code, following the next received read null from the entral controller. The central controller responds with a read nd command and the read end command when received on he next cycle of this channel is responded to with a read end cknowledge, thus terminating the read operation.

While the invention has been particularly shown and lescribed with respect to a preferred embodiment thereof, it will be understood by those skilled in the art that various changes in form and detail may be made therein without departing from the spirit and scope of the invention.

What is claimed is:

1. A data communications system for transmitting data between a central transmitting station under computer control and a plurality of remote terminals comprising:

a two conductor transmission medium interconnecting said remote terminals in series and said central station to first and last terminals in the series to form a serial transmission loop;

said central station including;

a data storage device under computer control for storing in sequential locations data to be transmitted in a predetermined number of communications channels, the data in each said channel including at least one multibit entity defining address, control and information for effecting communication between the central and one or more terminals, said predetermined number of communications channels and sequential locations being equal and substantially greater than one and substantially less than the number of series connected remote terminals, an output section for receiving in sequence the data associated with the channels from said data store and transmitting said channel data serial by bit to the first terminal in the serial loop and comprising, clock means for providing first timing pulses establishing a bit rate, second timing pulses establishing multibit information entity rate which is a function of the number of bits in an information entity, and third timing pulses establishing a channel rate which is a function of the number of entities in a channel, first means responsive to the third pulses for reading and making the data associated with sequential channels in the data store available for transmission, second means responsive to the second timing pulses for sequentially selecting the available entities associated with the available channel, and third means responsive to the first pulses for propagating the bits comprising each entity selected by the second means in series to the first terminal, an input section for receiving the serial data from the last terminal in the serial loop and for assembling said data in parallel entities comprising, means responsive to the data received from the last terminal for deriving a bit clock rate, means responsive to the data and the derived bit clock rate for storing and assembling the received serial data, means responsive to the bit clock rate for generating entity and channel rate pulses, and means responsive to the entity and channel rate pulses for transferring the assembled data to the same sequential location in the data store from which it emanated; and said terminals each including;

means responsive to the data bits received from the previous connected unit in the series loop for deriving bit and entity rate pulses, storage means connected to the transmission medium for receiving at least as many data bits as comprise an entity under control of said bit rate pulses and transmitting said bits from the storage means via the transmission medium to the next connected unit in the series loop, and means responsive to said entity rate pulses and to the contents of the storage means for examining each said entity for detecting the address, control and information and for selectively altering the contents of the storage means at that time depending on the received data.

2. A data communications system for transmitting data between a central station and a plurality of remote terminals comprising:

a two-conductor transmission medium interconnecting said remote terminals in series and said central station to the first and last terminals in the series to form a serial transmission loop, said central station including: means for establishing a plurality of sequential communications channels each having a predetermined number of data bits which are arranged to include channel start information, unique remote terminal address information for each connected terminal, control information and data, at least one of said channels having address information recognizable by all of the remote terminals as defining a vacant channel which may be utilized for communications purposes; means for transmitting the data bits in the sequential channels in serial form to the first terminal via the transmission medium; and means for receiving serial data bits from the last terminal via the transmission medium and indicating the sequential channels;

said terminals each including: means for receiving the serial data bits from the preceding unit on the loop and for retransmitting the data bits after a predetermined delay; means for examining the defined data components of each channel for detecting the address information defining a vacant channel and inserting its own unique address in place thereof when it is required to communicate with the central station.

3. A data communications system for transmitting data between a central station and a plurality of remote terminals comprising:

a two-conductor transmission medium interconnecting said remote terminals in series and said central station to the first and last terminals in the series to form a serial transmission loop;

said central station including;

a memory having $n$ sequential addresses each for storing parallel data bits to be transmitted to at least one of the remote terminals, each said address defining a communications channel including start information, address information, control information and data, said $n$ addresses being substantially greater than 1 and substantially less than the total number of remote terminals, a transmitter for receiving, in sequence, the parallel data bits defining a channel and transmitting them in predetermined serial form over the transmission medium to the first terminal;

means responsive to the transmitter for accessing the sequential channels in the memory and providing the data contained therein to the transmitter for transmission;

a receiver connected to the transmission medium for receiving the serial data from the last terminal in the serial loop;

circuit means responsive to the received data for altering the data in a predetermined manner as a function of the received data and for inserting the processed data in the same location in the memory it occupied prior to transmission;

means responsive to data supplied by a computer and to the said circuit means for inserting data from the computer in the specified address in the said memory and for transmitting predetermined data received from the transmission line to the computer;

said terminals each including;

means for receiving the serial data bits from the preceding unit in the loop and for transmitting the data bits after a predetermined delay, and means for examining the data bits in each channel for utilizing, altering or retransmitting in unaltered form the channel data as a function of the address, control and data in the received channel.

4. A method of communicating data between a central control station and a plurality of remote terminals connected in a series loop configuration with said central control station comprising the steps of:

establishing at said central station a repetitive sequence of $n$ time separated communications channels where $n$ is substantially greater than 1 and substantially less than the total number of remote terminals connected in the serial loop communications network;

generating at said central station for each of said channels a plurality of coded information carrying signals which include;

a first part for identifying the start of the channel, a second part for selectively designating a single terminal from amongst the plurality of terminals connected in the serial loop which is to communicate via the channel or alternatively designating more than one terminal any one of which may appropriate a channel including a said alternative second part, and a third part for conveying data;

transmitting the generated signals to the first terminal in the serial loop;

at each of said remote terminals in said serial loop;

storing and examining a finite number of the said coded information carrying signals before passing them on to a subsequent terminal in the loop to detect the first and second parts of the signals generated at the central, selectively accepting and inserting data in a channel bearing the specific terminal address in the said second part by selectively reading and altering the stored information carrying signals, and acquiring a communications channel when needed by detecting the said alternative second part and inserting in place thereof signals designating only the said terminal.

5. A data communications system for transmitting data between a central control station and a plurality of remote terminals connected in a series loop configuration comprising:

a two-conductor transmission medium interconnecting said remote stations in series and said central control station to the first and last terminals in the series to form a loop communications network;

said central station including;

means for establishing $n$ data communications channels where $n$ is substantially greater than 1 and substantially less than the total number of remote terminals connected in series on the loop;

each of said data communications channels having a number of data bits including channel start information, remote terminal address information and data;

at least one of said channels having remote terminal address information recognizable by all of the remote terminals as defining a vacant channel which may be utilized for communications purposes;

means for transmitting the said data bits serially by bit in sequence to the first loop terminal via the transmission medium, and means for receiving data serially by bit from the last loop terminal via the transmission medium;

said terminals each including, means for receiving the serial data bits from the preceding unit on the loop and for retransmitting the data bits in altered or unaltered form depending on the contents thereof, and means for examining data in the channels for detecting the address information defining a vacant channel and inserting a unique terminal address in place thereof when that terminal needs to communicate with the central station.

6. A method of communicating data between a central control station and a plurality of remote terminals connected in a series loop configuration with said central station comprising the steps of:

establishing at said central station a repetitive sequence of $n$ time separated communications channels, where $n$ is substantially greater than 1 and substantially less than the total number of remote terminals connected in the serial communications loop;

generating at said central station for each of said $n$ time separated channels coded information carrying signals which include;

a first part for identifying the start of the channel, a second part for selectively identifying a single remote terminal from amongst the plurality of remote terminals connected in the serial communications loop which is to communicate via the channel, and a third part for conveying information;

transmitting the generated signals to the first terminal in the serial communications loop;

at each of said remote terminals in said serial communications loop storing and examining a finite number of information carrying signals before passing them on to a subsequent terminal in the loop to detect the said first and second parts of the signals generated at the central, and selectively accepting and inserting data in a channel including the specific terminal address in the said second part by selectively reading and altering the information carrying signal.

7. A data communications system for transmitting data between a central station and a plurality of remote terminals comprising:

a transmission medium interconnecting said remote terminals in series and said central station to the first and last terminals in the series to form a serial transmission loop;

said central station including: means for establishing a plurality of sequential communications channels each having a predetermined number of data bits which are arranged to include at least, unique remote terminal address information for each connected terminal and data, at least one of said channels having address information recognizable by more than one of the remote terminals as defining a vacant channel which may be utilized for communications purposes; means for transmitting the data bits in the sequential channels in serial form to the first terminal via the transmission medium; and means for receiving serial data bits from the last terminal via the transmission medium;

said terminals each including: means for receiving serial data bits from the preceding units on the loop and for retransmitting the data bits after a predetermined delay, means for examining the received data components of each channel for detecting the addressing information defining a vacant channel, and means responsive to the means for detecting information defining a vacant channel for inserting its own unique address in place thereof when it is required to communicate with the central station.

8. A method of communicating data between a central control station and a plurality of remote terminals connected in a series loop configuration with said central control station comprising the steps of:

establishing at said central station a repetitive sequence of *n* time separated communications channels where *n* is substantially greater than one and substantially less than the total number of remote terminals connected in the serial loop communications network;

generating at said central station for each of said channels a plurality of coded information carrying signals which include;

a first part for selectively designating a single terminal from amongst the plurality of terminals connected in the serial loop which is to communicate via the channel or alternatively designating more than one terminal, any one of which may appropriate a channel including a said alternative first part, and a second part for conveying data;

transmitting the generated signals to the first terminal in the serial loop;

at each of said remote terminals in said serial loop;

storing and examining a finite number of the said coded information carrying signals before passing them on to a subsequent terminal in the loop, and acquiring a communications channel when needed by detecting the said alternative first part and inserting in place thereof the signals designating only the said terminal.

9. A data communications system for transmitting data between a central control station and a plurality of remote terminals connected in a series loop configuration comprising:

a transmission medium interconnecting the remote stations in series and said central control station to the first and last terminals in the series to form a loop communications network;

said central station including;

means for establishing *n* data communications channels where *n* is substantially greater than 1 and substantially less than the total number of remote terminals connected in series on the loop;

each of said data communications channels have a number of data bits including remote terminal address information and data;

at least one of said channels having remote terminal address information recognizable by more than one of the remote terminals as defining a vacant channel which may be utilized for communications purposes;

means for transmitting said data bits serially by bit in sequence to the first loop terminal via the transmission medium, and means for receiving data serial by bit from the last loop terminal via the transmission medium;

said terminals each including, means for receiving serial data bits from the preceding unit on the loop and for retransmitting the data bits in altered or unaltered form depending on the contents thereof, and means for examining data in the channels for detecting the address information defining a vacant channel and inserting a unique terminal address in place thereof when that terminal needs to communicate with the central station.

* * * * *

PO-1050
(5/69)

UNITED STATES PATENT OFFICE
CERTIFICATE OF CORRECTION

Patent No. 3,639,694 Dated February 1, 1972

Inventor(s) Herman Deutsch; Edgar H. Steward; Walter D. Van Gieson, Jr.

It is certified that error appears in the above-identified patent and that said Letters Patent are hereby corrected as shown below:

Column 4, line 32, delete "r" and insert --n--;

Column 12, line 75, delete "199" and insert --119--;

Column 17, line 54, delete "thereon" and insert --therein--; and

Column 20, line 64, delete "right" and insert --write--.

Signed and sealed this 12th day of September 1972.

(SEAL)
Attest:

EDWARD M.FLETCHER,JR.
Attesting Officer

ROBERT GOTTSCHALK
Commissioner of Patents